US012584315B2

(12) United States Patent (10) Patent No.: US 12,584,315 B2

Lem (45) Date of Patent: Mar. 24, 2026

(54) FLEXIBLE POLYMERIC ROOFING MATERIALS AND RELATED SYSTEMS AND RELATED METHODS

(71) Applicant: BMIC LLC, Dallas, TX (US)

(72) Inventor: Paul Lem, Mountain Lakes, NJ (US)

(73) Assignee: BMIC LLC, Dallas, TX (US)

( * ) Notice: Subject to any disclaimer, the term of this patent is extended or adjusted under 35 U.S.C. 154(b) by 0 days.

(21) Appl. No.: 19/025,044

(22) Filed: Jan. 16, 2025

(65) Prior Publication Data

US 2025/0230656 A1 Jul. 17, 2025

Related U.S. Application Data

(60) Provisional application No. 63/621,499, filed on Jan. 16, 2024.

(51) Int. Cl.
| | |
|---|---|
| *E04D 5/10* | (2006.01) |
| *B32B 7/12* | (2006.01) |
| *B32B 27/32* | (2006.01) |

(52) U.S. Cl.
CPC .................. *E04D 5/10* (2013.01); *B32B 7/12* (2013.01); *B32B 27/32* (2013.01); *B32B 2250/03* (2013.01); *B32B 2307/50* (2013.01); *B32B 2323/04* (2013.01); *B32B 2323/10* (2013.01); *B32B 2419/06* (2013.01)

(58) Field of Classification Search
CPC ... B32B 2419/00; B32B 2419/06; E04D 5/00; E04D 5/06; E04D 5/10
See application file for complete search history.

(56) References Cited

U.S. PATENT DOCUMENTS

| | | | |
|---|---|---|---|
| 6,864,194 | B2 | 3/2005 | Hindi et al. |
| 6,864,195 | B2 | 3/2005 | Peng |
| 7,101,628 | B2 | 9/2006 | Peng |
| 7,641,964 | B2 | 1/2010 | Swei et al. |
| 7,749,924 | B2 | 7/2010 | Peng |
| 7,882,671 | B2 | 2/2011 | Bruce et al. |
| 9,359,014 | B1 | 6/2016 | Yang et al. |
| 9,533,067 | B2 | 1/2017 | Schonbeck et al. |
| 9,926,443 | B2 | 3/2018 | Li et al. |
| 10,414,140 | B2 | 9/2019 | Zacarias et al. |
| 10,485,713 | B2 | 11/2019 | Schonbeck et al. |
| 11,135,100 | B2 | 10/2021 | Schonbeck et al. |
| 11,179,278 | B2 | 11/2021 | Schonbeck et al. |
| 11,242,684 | B2 | 2/2022 | Wang et al. |
| 11,590,033 | B2 | 2/2023 | Schonbeck et al. |

(Continued)

FOREIGN PATENT DOCUMENTS

WO WO-2021229024 A2 * 11/2021 ............... B32B 3/02

*Primary Examiner* — Zachary M Davis

(74) *Attorney, Agent, or Firm* — GREENBERG TRAURIG, LLP

(57) ABSTRACT

A roofing material is provided. The roofing material comprises a first layer, The first layer comprises 1% to 65% by weight of a first non-styrenic propylene copolymer based on a total weight of the first layer. The first layer comprises 1% to 65% by weight of a second non-styrenic propylene copolymer based on the total weight of the first layer. The first non-styrenic propylene copolymer is different from the second non-styrenic propylene copolymer. The roofing material does not comprise an olefin block copolymer. Other roofing materials, and related systems and related methods, are provided.

20 Claims, 3 Drawing Sheets

100

110

120

130

140

(56)  References Cited

U.S. PATENT DOCUMENTS

| 11,629,247 | B2 | 4/2023 | Qian et al. |
| 11,684,115 | B2 | 6/2023 | Gopalan et al. |
| 11,807,785 | B2 | 11/2023 | Lem et al. |
| 11,987,025 | B2 | 5/2024 | Hao et al. |
| 11,987,986 | B2 | 5/2024 | Wang et al. |
| 12,428,842 | B2 | 9/2025 | Wang et al. |
| 2004/0033741 | A1 | 2/2004 | Peng |
| 2004/0185288 | A1 | 9/2004 | Peng |
| 2006/0046084 | A1 | 3/2006 | Yang et al. |
| 2007/0194482 | A1 | 8/2007 | Douglas et al. |
| 2008/0029210 | A1 | 2/2008 | Swei et al. |
| 2010/0255739 | A1 | 10/2010 | Black et al. |
| 2015/0314511 | A1 | 11/2015 | Stoiljkovic et al. |
| 2016/0312470 | A1 | 10/2016 | Wang et al. |
| 2017/0368810 | A1 | 12/2017 | Zacarias et al. |
| 2018/0094439 | A1 * | 4/2018 | Wang et al. |
| 2021/0095474 | A1 * | 4/2021 | Yang .................... B32B 15/043 |
| 2022/0080712 | A1 | 3/2022 | Wang et al. |
| 2023/0220244 | A1 | 7/2023 | Lem et al. |
| 2023/0279661 | A1 | 9/2023 | Wang et al. |
| 2023/0285205 | A1 | 9/2023 | Schonbeck et al. |
| 2025/0034435 | A1 | 1/2025 | Lem et al. |
| 2025/0074040 | A1 | 3/2025 | Zhang et al. |
| 2025/0230656 | A1 | 7/2025 | Lem |

* cited by examiner

FLEXIBLE POLYMERIC ROOFING MATERIALS AND RELATED SYSTEMS AND RELATED METHODS

CROSS-REFERENCE TO RELATED APPLICATIONS

This application claims priority to U.S. Provisional Patent Application No. 63/621,499, filed Jan. 16, 2024, and titled "FLEXIBLE POLYMERIC ROOFING MATERIALS AND RELATED SYSTEMS AND RELATED METHODS," the disclosure of which application is hereby incorporated herein by reference in its entirety.

FIELD

This disclosure generally relates to flexible polymeric roofing materials, and related systems and related methods.

BACKGROUND

Roofing membranes, when installed on roofing, are exposed to various environmental conditions. These conditions include changes in temperature, as well as precipitation and other environmental conditions.

SUMMARY

Some embodiments relate to a roofing membrane. In some embodiments, the roofing membrane comprises a first layer. In some embodiments, the first layer comprises 1% 65% by weight of a first non-styrenic propylene copolymer based on a total weight of the first layer. In some embodiments, the first layer comprises 1% to 65% by weight of a second non-styrenic propylene copolymer based on the total weight of the first layer. In some embodiments, the first non-styrenic propylene copolymer is different from the second non-styrenic propylene copolymer. In some embodiments, the roofing membrane does not comprise an olefin block copolymer.

In some embodiments, the first non-styrenic propylene copolymer comprises ethylene.

In some embodiments, the second non-styrenic propylene copolymer comprises ethylene.

In some embodiments, the second non-styrenic propylene copolymer comprises an isotactic propylene.

In some embodiments, the roofing membrane further comprises 0.1% to 25% by weight of at least one additive based on the total weight of the first layer. In some embodiments, the at least one additive comprises at least one of a colorant, an antioxidant, an ultraviolet stabilizer, a processing aid, a fire retardant, or any combination thereof.

In some embodiments, the roofing membrane does not comprise a limestone.

In some embodiments, the roofing membrane further comprises at least one reinforcement layer. In some embodiments, the first layer is located on the at least one reinforcement layer.

In some embodiments, the roofing membrane further comprises an adhesive layer.

In some embodiments, the roofing membrane further comprises a release liner. In some embodiments, the adhesive layer is located between the first layer and the release liner.

In some embodiments, the release liner covers the adhesive layer.

In some embodiments, the roofing membrane, after being flattened in an oven for 10 minutes at 158° F. and tested according to ASTM D638, exhibits a tensile modulus of A) 15 MPa or less in a machine direction; or B) 10 MPa or less in a cross-machine direction.

In some embodiments, the roofing membrane, when tested according to ASTM D638, exhibits a tensile modulus of A) 35 MPa or less in a machine direction; or B) 20 MPa or less in a cross-machine direction.

Some embodiments relate to a roofing system. In some embodiments, the roofing system comprises a roofing substrate. In some embodiments, the roofing system comprises a roofing membrane. In some embodiments, the roofing membrane is located on the roofing substrate. In some embodiments, the roofing membrane comprises a first layer. In some embodiments, the first layer comprises 1% to 65% by weight of a first non-styrenic propylene copolymer based on a total weight of the first layer. In some embodiments, the first layer comprises 1% to 65% by weight of a second non-styrenic propylene copolymer based on the total weight of the first layer. In some embodiments, the first non-styrenic propylene copolymer is different from the second non-styrenic propylene copolymer. In some embodiments, the roofing membrane does not comprise an olefin block copolymer.

In some embodiments, the roofing membrane directly contacts the roofing substrate.

In some embodiments, the roofing membrane further comprises an adhesive layer.

In some embodiments, the adhesive layer is located between the first layer and the roofing substrate. In some embodiments, the adhesive layer adheres the roofing membrane to the roofing substrate.

In some embodiments, the roofing membrane is heat welded to the roofing substrate.

In some embodiments, the roofing membrane, after being flattened in an oven for 10 minutes at 158° F. and tested according to ASTM D638, exhibits a tensile modulus of A) 15 MPa or less in a machine direction; or B) 10 MPa or less in a cross-machine direction.

In some embodiments, the roofing membrane, when tested according to ASTM D638, exhibits a tensile modulus of A) 35 MPa or less in a machine direction; or B) 20 MPa or less in a cross-machine direction.

Some embodiments relate to a roofing membrane. In some embodiments, the roofing membrane comprises a first layer. In some embodiments, the first layer consists essentially of 1% to 65% by weight of a first non-styrenic propylene copolymer based on a total weight of the first layer. In some embodiments, the first layer consists essentially of 1% to 65% by weight of a second non-styrenic propylene copolymer based on the total weight of the first layer. In some embodiments, the first non-styrenic propylene copolymer is different from the second non-styrenic propylene copolymer. In some embodiments, the first layer consists essentially of no greater than 25% by weight of at least one additive based on the total weight of the first layer. In some embodiments, the at least one additive comprises at least one of a colorant, an antioxidant, an ultraviolet stabilizer, a processing aid, a fire retardant, or any combination thereof. In some embodiments, the roofing membrane does not comprise an olefin block copolymer.

In some embodiments, the roofing membrane further comprises at least one reinforcement layer. In some embodiments, the first layer is located on the at least one reinforcement layer.

In some embodiments, the roofing membrane further comprises an adhesive layer.

In some embodiments, the roofing membrane further comprises a release liner. In some embodiments, the adhesive layer is located between the first layer and the release liner.

In some embodiments, the release liner covers the adhesive layer.

In some embodiments, the roofing membrane, after being flattened in an oven for 10 minutes at 158° F. and tested according to ASTM D638, exhibits a tensile modulus of A) 15 MPa or less in a machine direction; or B) 10 MPa or less in a cross-machine direction.

Some embodiments relate to a roofing system. In some embodiments, the roofing system comprises a roofing substrate. In some embodiments, the roofing system comprises a protruding member. In some embodiments, the roofing system comprises a flashing area. In some embodiments, the roofing system comprises a roofing membrane. In some embodiments, the protruding member protrudes from the roofing substrate. In some embodiments, the flashing area is located at an interface between the roofing substrate and the protruding member. In some embodiments, the roofing membrane covers the flashing area, at least a portion of the protruding member, and at least a portion of the roofing substrate. In some embodiments, the roofing membrane comprises 1% to 65% by weight of a first non-styrenic propylene copolymer based on a total weight of the roofing membrane. In some embodiments, the roofing membrane comprises 1% to 65% by weight of a second non-styrenic propylene copolymer based on the total weight of the roofing membrane. In some embodiments, the first non-styrenic propylene copolymer is different from the second non-styrenic propylene copolymer. In some embodiments, the roofing membrane does not comprise A) a reinforcement layer; nor B) an olefin block copolymer.

In some embodiments, the roofing membrane comprises a first end. In some embodiments, the roofing membrane comprises a second end opposite the first end. In some embodiments, the roofing membrane covers the protruding member, such that the first end overlaps at least a portion of the second end to obtain an overlapping portion. In some embodiments, the first end and the second end are heat welded together in the overlapping portion.

In some embodiments, when tested according to ASTM D413, a 180° peel strength between the first end and the second end in the overlapping portion is 2 PLI to 30 PLI.

Some embodiments relate to a roofing accessory. In some embodiments, the roofing accessory comprises a first layer. In some embodiments, the first layer comprises 1% to 65% by weight of a first non-styrenic propylene copolymer based on a total weight of the first layer. In some embodiments, the first layer comprises 1% to 65% by weight of a second non-styrenic propylene copolymer based on the total weight of the first layer. In some embodiments, the first non-styrenic propylene copolymer is different from the second non-styrenic propylene copolymer. In some embodiments, the first layer does not comprise an olefin block copolymer.

In some embodiments, the roofing accessory is at least one of a T-joint patch, a vent boot, a penetration pocket, a universal corner, a cover tape, a pipe boot, a split pipe boot, a square tube wrap, a pourable sealer pocket, a corner reinforcement, a roof penetration, or any combination thereof.

In some embodiments, the roofing membrane further comprises a reinforcement layer. In some embodiments, the first layer is located on the reinforcement layer.

Some embodiments relate to a roofing system. In some embodiments, the roofing system comprises a roofing substrate. In some embodiments, the roofing system comprises a roofing accessory. In some embodiments, the roofing accessory is located on the roofing substrate. In some embodiments, the roofing accessory comprises a first layer. In some embodiments, the first layer comprises 1% to 65% by weight of a first non-styrenic propylene copolymer based on a total weight of the first layer. In some embodiments, the first layer comprises 1% to 65% by weight of a second non-styrenic propylene copolymer based on the total weight of the first layer. In some embodiments, the first non-styrenic propylene copolymer is different from the second non-styrenic propylene copolymer. In some embodiments, the roofing accessory does not comprise an olefin block copolymer.

In some embodiments, the roofing accessory is at least one of a T-joint patch, a vent boot, a penetration pocket, a universal corner, a cover tape, a pipe boot, a split pipe boot, a square tube wrap, a pourable sealer pocket, a corner reinforcement, a roof penetration, or any combination thereof.

BRIEF DESCRIPTION OF THE DRAWINGS

Reference is made to the drawings that form a part of this disclosure, and which illustrate embodiments in which the materials and methods described herein can be practiced.

DETAILED DESCRIPTION

Figure 1:
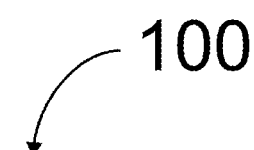
FIG. 1 is a schematic diagram of a cross-section of at least a portion of a roofing material, according to some embodiments.
Figure 1:
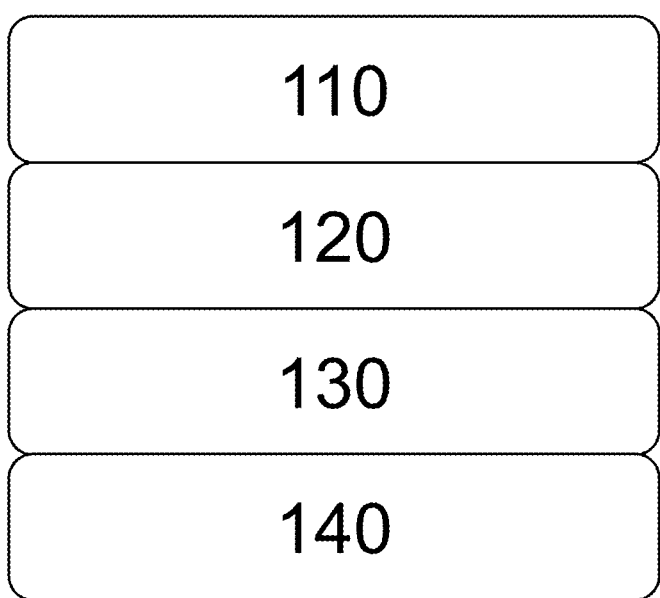

Some embodiments relate to roofing materials, and related systems and related methods. In some embodiments, the roofing materials exhibit improved flexibility and/or minimal to no blocking. For example, in some embodiments, the improvements in flexibility permit the roofing materials to be used as detailing roofing membranes. In some embodiments, the roofing materials are capable of being heat welded together or heat welded to other roofing materials, even at low temperatures. In some embodiments, the roofing materials can be stretched and/or wrapped around protrusions (e.g., pipes, chimneys, etc.) extending upwards from a roofing substrate, with the ends heat welded together or otherwise secured so as to cover the protrusions. In some embodiments, the roofing materials with improved flexibility are less prone to cracking when being stretched relative to conventional roofing materials and in response to variations in environmental conditions (e.g., changes in temperatures). In some embodiments, the roofing materials exhibit improved coefficients of thermal expansion. In some embodiments, the roofing materials exhibit improved durability and longevity relative to conventional materials, and also can be provided in a variety of configurations, including, for example and without limitation, at least one of reinforced materials, unreinforced materials, multi-layered materials, or any combination thereof.

As used herein, the term "roofing material" refers to at least one of a roofing membrane, a roofing accessory, a roofing substrate, a roofing shingle, or any combination thereof.

In some embodiments, the roofing material comprises at least one layer.

In some embodiments, the at least one layer comprises one (1) layer to ten (10) layers. In some embodiments, the at least one layer comprises, for example, at least one of a first layer, a second layer, a third layer, a fourth layer, a fifth layer, a sixth layer, a seventh layer, a ninth layer, a tenth layer, or any combination thereof. In some embodiments, the at least one layer comprises more than ten (10) layers. In some embodiments, at least two of the at least one layer are the same. In some embodiments, at least two of the at least one layer are different. In some embodiments, an intervening layer is located between at least two of the at least one layers. In some embodiments, at least two of the at least one layer directly contact each other. In some embodiments, the at least one layer comprises a polymer layer. In some embodiments, the at least one layer comprises an adhesive layer. In some embodiments, the at least one layer comprises a reinforcement layer. In some embodiments, the at least one layer comprises a release liner.

As used herein, the term "non-styrenic," when used as a modifier, refers to a substance that does not comprise styrene, whether the styrene is substituted or unsubstituted. In some embodiments, for example, the first non-styrenic polymer does not comprise at least one of a styrene-iso-prene-styrene (SIS) polymer, styrene-butadiene-styrene (SBS), styrene-ethylene/butadiene-styrene (SEBS), styrene-ethylene-propylene-styrene (SEPS), a styrene-butadiene rubber (SBR), styrene-ethylene/propylene (SEP), or any combination thereof.

In some embodiments, the at least one layer comprises 1% to 98% by weight of at least one non-styrenic polymer based on a total weight of the at least one layer. In some embodiments, the at least one layer comprises 1% to 97% by weight of the at least one non-styrenic polymer based on the total weight of the at least one layer. In some embodiments, the at least one layer comprises 1% to 96% by weight of the at least one non-styrenic polymer based on the total weight of the at least one layer. In some embodiments, the at least one layer comprises 1% to 95% by weight of the at least one non-styrenic polymer based on the total weight of the at least one layer. In some embodiments, the at least one layer comprises 1% to 94% by weight of the at least one non-styrenic polymer based on the total weight of the at least one layer. In some embodiments, the at least one layer comprises 1% to 93% by weight of the at least one non-styrenic polymer based on the total weight of the at least one layer. In some embodiments, the at least one layer comprises 1% to 92% by weight of the at least one non-styrenic polymer based on the total weight of the at least one layer. In some embodiments, the at least one layer comprises 1% to 91% by weight of the at least one non-styrenic polymer based on the total weight of the at least one layer. In some embodiments, the at least one layer comprises 1% to 90% by weight of the at least one non-styrenic polymer based on the total weight of the at least one layer. In some embodiments, the at least one layer comprises 1% to 85% by weight of the at least one non-styrenic polymer based on the total weight of the at least one layer. In some embodiments, the at least one layer comprises 1% to 80% by weight of the at least one non-styrenic polymer based on the total weight of the at least one layer. In some embodiments, the at least one layer comprises 1% to 75% by weight of the at least one non-styrenic polymer based on the total weight of the at least one layer. In some embodiments, the at least one layer comprises 1% to 70% by weight of the at least one non-styrenic polymer based on the total weight of the at least one layer. In some embodiments, the at least one layer comprises 1% to 65% by weight of the at least one non-styrenic polymer based on the total weight of the at least one layer. In some embodiments, the at least one layer comprises 1% to 60% by weight of the at least one non-styrenic polymer based on the total weight of the at least one layer. In some embodiments, the at least one layer comprises 1% to 55% by weight of the at least one non-styrenic polymer based on the total weight of the at least one layer. In some embodiments, the at least one layer comprises 1% to 50% by weight of the at least one non-styrenic polymer based on the total weight of the at least one layer. In some embodiments, the at least one layer comprises 1% to 45% by weight of the at least one non-styrenic polymer based on the total weight of the at least one layer. In some embodiments, the at least one layer comprises 1% to 40% by weight of the at least one non-styrenic polymer based on the total weight of the at least one layer. In some embodiments, the at least one layer comprises 1% to 35% by weight of the at least one non-styrenic polymer based on the total weight of the at least one layer. In some embodiments, the at least one layer comprises 1% to 30% by weight of the at least one non-styrenic polymer based on the total weight of the at least one layer. In some embodiments, the at least one layer comprises 1% to 25% by weight of the at least one non-styrenic polymer based on the total weight of the at least one layer. In some embodiments, the at least one layer comprises 1% to 20% by weight of the at least one non-styrenic polymer based on the total weight of the at least one layer. In some embodiments, the at least one layer comprises 1% to 15% by weight of the at least one non-styrenic polymer based on the total weight of the at least one layer. In some embodiments, the at least one layer comprises 1% to 10% by weight of the at least one non-styrenic polymer based on the total weight of the at least one layer. In some embodiments, the at least one layer comprises 1% to 5% by weight of the at least one non-styrenic polymer based on the total weight of the at least one layer.

In some embodiments, the at least one layer comprises 5% to 98% by weight of the at least one non-styrenic polymer based on the total weight of the at least one layer. In some embodiments, the at least one layer comprises 10% to 98% by weight of the at least one non-styrenic polymer based on the total weight of the at least one layer. In some embodiments, the at least one layer comprises 15% to 98% by weight of the at least one non-styrenic polymer based on the total weight of the at least one layer. In some embodiments, the at least one layer comprises 20% to 98% by weight of the at least one non-styrenic polymer based on the total weight of the at least one layer. In some embodiments, the at least one layer comprises 25% to 98% by weight of the at least one non-styrenic polymer based on the total weight of the at least one layer. In some embodiments, the at least one layer comprises 30% to 98% by weight of the at least one non-styrenic polymer based on the total weight of the at least one layer. In some embodiments, the at least one layer comprises 35% to 98% by weight of the at least one non-styrenic polymer based on the total weight of the at least one layer. In some embodiments, the at least one layer comprises 40% to 98% by weight of the at least one non-styrenic polymer based on the total weight of the at least one layer. In some embodiments, the at least one layer comprises 45% to 98% by weight of the at least one non-styrenic polymer based on the total weight of the at least one layer. In some embodiments, the at least one layer comprises 50% to 98% by weight of the at least one non-styrenic polymer based on the total weight of the at least one layer. In some embodiments, the at least one layer comprises 55% to 98% by weight of the at least one non-styrenic polymer based on the total weight of the at least one layer. In some embodiments, the at least one layer comprises 60% to 98% by weight of the at least one non-styrenic polymer based on the total weight of the at least one layer. In some embodiments, the at least one layer comprises 65% to 98% by weight of the at least one non-styrenic polymer based on the total weight of the at least one layer. In some embodiments, the at least one layer comprises 70% to 98% by weight of the at least one non-styrenic polymer based on the total weight of the at least one layer. In some embodiments, the at least one layer comprises 75% to 98% by weight of the at least one non-styrenic polymer based on the total weight of the at least one layer. In some embodiments, the at least one layer comprises 80% to 98% by weight of the at least one non-styrenic polymer based on the total weight of the at least one layer. In some embodiments, the at least one layer comprises 85% to 98% by weight of the at least one non-styrenic polymer based on the total weight of the at least one layer. In some embodiments, the at least one layer comprises 90% to 98% by weight of the at least one non-styrenic polymer based on the total weight of the at least one layer. In some embodiments, the at least one layer comprises 91% to 98% by weight of the at least one non-styrenic polymer based on the total weight of the at least one layer. In some embodiments, the at least one layer comprises 92% to 98% by weight of the at least one non-styrenic polymer based on the total weight of the at least one layer. In some embodiments, the at least one layer comprises 93% to 98% by weight of the at least one non-styrenic polymer based on the total weight of the at least one layer. In some embodiments, the at least one layer comprises 94% to 98% by weight of the at least one non-styrenic polymer based on the total weight of the at least one layer. In some embodiments, the at least one layer comprises 95% to 98% by weight of the at least one non-styrenic polymer based on the total weight of the at least one layer. In some embodiments, the at least one layer comprises 96% to 98% by weight of the at least one non-styrenic polymer based on the total weight of the at least one layer. In some embodiments, the at least one layer comprises 97% to 98% by weight of the at least one non-styrenic polymer based on the total weight of the at least one layer.

In some embodiments, the at least one layer comprises 1% to 65% by weight of a first non-styrenic polymer based on the total weight of the at least one layer. In some embodiments, the at least one layer comprises 1% to 60% by weight of the first non-styrenic polymer based on the total weight of the at least one layer. In some embodiments, the at least one layer comprises 1% to 55% by weight of the first non-styrenic polymer based on the total weight of the at least one layer. In some embodiments, the at least one layer comprises 1% to 50% by weight of the first non-styrenic polymer based on the total weight of the at least one layer. In some embodiments, the at least one layer comprises 1% to 45% by weight of the first non-styrenic polymer based on the total weight of the at least one layer. In some embodiments, the at least one layer comprises 1% to 40% by weight of the first non-styrenic polymer based on the total weight of the at least one layer. In some embodiments, the at least one layer comprises 1% to 35% by weight of the first non-styrenic polymer based on the total weight of the at least one layer. In some embodiments, the at least one layer comprises 1% to 30% by weight of the first non-styrenic polymer based on the total weight of the at least one layer. In some embodiments, the at least one layer comprises 1% to 25% by weight of the first non-styrenic polymer based on the total weight of the at least one layer. In some embodiments, the at least one layer comprises 1% to 20% by weight of the first non-styrenic polymer based on the total weight of the at least one layer. In some embodiments, the at least one layer comprises 1% to 15% by weight of the first non-styrenic polymer based on the total weight of the at least one layer. In some embodiments, the at least one layer comprises 1% to 10% by weight of the first non-styrenic polymer based on the total weight of the at least one layer. In some embodiments, the at least one layer comprises 1% to 5% by weight of the first non-styrenic polymer based on the total weight of the at least one layer.

In some embodiments, the at least one layer comprises 5% to 65% by weight of the first non-styrenic polymer based on the total weight of the at least one layer. In some embodiments, the at least one layer comprises 10% to 65% by weight of the first non-styrenic polymer based on the total weight of the at least one layer. In some embodiments, the at least one layer comprises 15% to 65% by weight of the first non-styrenic polymer based on the total weight of the at least one layer. In some embodiments, the at least one layer comprises 20% to 65% by weight of the first non-styrenic polymer based on the total weight of the at least one layer. In some embodiments, the at least one layer comprises 25% to 65% by weight of the first non-styrenic polymer based on the total weight of the at least one layer. In some embodiments, the at least one layer comprises 30% to 65% by weight of the first non-styrenic polymer based on the total weight of the at least one layer. In some embodiments, the at least one layer comprises 35% to 65% by weight of the first non-styrenic polymer based on the total weight of the at least one layer. In some embodiments, the at least one layer comprises 40% to 65% by weight of the first non-styrenic polymer based on the total weight of the at least one layer. In some embodiments, the at least one layer comprises 45% to 65% by weight of the first non-styrenic polymer based on the total weight of the at least one layer. In some embodiments, the at least one layer comprises 50% to 65% by weight of the first non-styrenic polymer based on the total weight of the at least one layer. In some embodiments, the at least one layer comprises 55% to 65% by weight of the first non-styrenic polymer based on the total weight of the at least one layer. In some embodiments, the at least one layer comprises 60% to 65% by weight of the first non-styrenic polymer based on the total weight of the at least one layer.

In some embodiments, the at least one layer comprises 1% to 65% by weight of a second non-styrenic polymer based on the total weight of the at least one layer. In some embodiments, the at least one layer comprises 1% to 60% by weight of the second non-styrenic polymer based on the total weight of the at least one layer. In some embodiments, the at least one layer comprises 1% to 55% by weight of the second non-styrenic polymer based on the total weight of the at least one layer. In some embodiments, the at least one layer comprises 1% to 50% by weight of the second non-styrenic polymer based on the total weight of the at least one layer. In some embodiments, the at least one layer comprises 1% to 45% by weight of the second non-styrenic polymer based on the total weight of the at least one layer. In some embodiments, the at least one layer comprises 1% to 40% by weight of the second non-styrenic polymer based on the total weight of the at least one layer. In some embodiments, the at least one layer comprises 1% to 35% by weight of the second non-styrenic polymer based on the total weight of the at least one layer. In some embodiments, the at least one layer comprises 1% to 30% by weight of the second non-styrenic polymer based on the total weight of the at least one layer. In some embodiments, the at least one layer comprises 1% to 25% by weight of the second non-styrenic polymer based on the total weight of the at least one layer. In some embodiments, the at least one layer comprises 1% to 20% by weight of the second non-styrenic polymer based on the total weight of the at least one layer. In some embodiments, the at least one layer comprises 1% to 15% by weight of the second non-styrenic polymer based on the total weight of the at least one layer. In some embodiments, the at least one layer comprises 1% to 10% by weight of the second non-styrenic polymer based on the total weight of the at least one layer. In some embodiments, the at least one layer comprises 1% to 5% by weight of the second non-styrenic polymer based on the total weight of the at least one layer.

In some embodiments, the at least one layer comprises 5% to 65% by weight of the second non-styrenic polymer based on the total weight of the at least one layer. In some embodiments, the at least one layer comprises 10% to 65% by weight of the second non-styrenic polymer based on the total weight of the at least one layer. In some embodiments, the at least one layer comprises 15% to 65% by weight of the second non-styrenic polymer based on the total weight of the at least one layer. In some embodiments, the at least one layer comprises 20% to 65% by weight of the second non-styrenic polymer based on the total weight of the at least one layer. In some embodiments, the at least one layer comprises 25% to 65% by weight of the second non-styrenic polymer based on the total weight of the at least one layer. In some embodiments, the at least one layer comprises 30% to 65% by weight of the second non-styrenic polymer based on the total weight of the at least one layer. In some embodiments, the at least one layer comprises 35% to 65% by weight of the second non-styrenic polymer based on the total weight of the at least one layer. In some embodiments, the at least one layer comprises 40% to 65% by weight of the second non-styrenic polymer based on the total weight of the at least one layer. In some embodiments, the at least one layer comprises 45% to 65% by weight of the second non-styrenic polymer based on the total weight of the at least one layer. In some embodiments, the at least one layer comprises 50% to 65% by weight of the second non-styrenic polymer based on the total weight of the at least one layer. In some embodiments, the at least one layer comprises 55% to 65% by weight of the second non-styrenic polymer based on the total weight of the at least one layer. In some embodiments, the at least one layer comprises 60% to 65% by weight of the second non-styrenic polymer based on the total weight of the at least one layer.

In some embodiments, the at least one layer comprises no greater than 25% by weight of at least one additive based on the total weight of the at least one layer. In some embodiments, the at least one layer comprises no greater than 24% by weight of at least one additive based on the total weight of the at least one layer. In some embodiments, the at least one layer comprises no greater than 23% by weight of at least one additive based on the total weight of the at least one layer. In some embodiments, the at least one layer comprises no greater than 22% by weight of at least one additive based on the total weight of the at least one layer. In some embodiments, the at least one layer comprises no greater than 21% by weight of at least one additive based on the total weight of the at least one layer. In some embodiments, the at least one layer comprises no greater than 20% by weight of at least one additive based on the total weight of the at least one layer. In some embodiments, the at least one layer comprises no greater than 19% by weight of at least one additive based on the total weight of the at least one layer. In some embodiments, the at least one layer comprises no greater than 18% by weight of at least one additive based on the total weight of the at least one layer. In some embodiments, the at least one layer comprises no greater than 17% by weight of at least one additive based on the total weight of the at least one layer. In some embodiments, the at least one layer comprises no greater than 16% by weight of at least one additive based on the total weight of the at least one layer. In some embodiments, the at least one layer comprises no greater than 15% by weight of at least one additive based on the total weight of the at least one layer. In some embodiments, the at least one layer comprises no greater than 14% by weight of at least one additive based on the total weight of the at least one layer. In some embodiments, the at least one layer comprises no greater than 13% by weight of at least one additive based on the total weight of the at least one layer. In some embodiments, the at least one layer comprises no greater than 12% by weight of at least one additive based on the total weight of the at least one layer. In some embodiments, the at least one layer comprises no greater than 11% by weight of at least one additive based on the total weight of the at least one layer. In some embodiments, the at least one layer comprises no greater than 10% by weight of at least one additive based on the total weight of the at least one layer. In some embodiments, the at least one layer comprises no greater than 9% by weight of at least one additive based on the total weight of the at least one layer. In some embodiments, the at least one layer comprises no greater than 8% by weight of at least one additive based on the total weight of the at least one layer. In some embodiments, the at least one layer comprises no greater than 7% by weight of at least one additive based on the total weight of the at least one layer. In some embodiments, the at least one layer comprises no greater than 6% by weight of at least one additive based on the total weight of the at least one layer. In some embodiments, the at least one layer comprises no greater than 5% by weight of at least one additive based on the total weight of the at least one layer. In some embodiments, the at least one layer comprises no greater than 4% by weight of at least one additive based on the total weight of the at least one layer. In some embodiments, the at least one layer comprises no greater than 3% by weight of at least one additive based on the total weight of the at least one layer. In some embodiments, the at least one layer comprises no greater than 2% by weight of at least one additive based on the total weight of the at least one layer. In some embodiments, the at least one layer comprises no greater than 1% by weight of at least one additive based on the total weight of the at least one layer. In some embodiments, the at least one layer comprises no greater than 0.5% by weight of at least one additive based on the total weight of the at least one layer.

In some embodiments, the at least one layer comprises 0.1% to 25% by weight of the at least one additive based on the total weight of the at least one layer. In some embodiments, the at least one layer comprises 0.1% to 24% by weight of the at least one additive based on the total weight of the at least one layer. In some embodiments, the at least one layer comprises 0.1% to 23% by weight of the at least one additive based on the total weight of the at least one layer. In some embodiments, the at least one layer comprises 0.1% to 22% by weight of the at least one additive based on the total weight of the at least one layer. In some embodiments, the at least one layer comprises 0.1% to 21% by weight of the at least one additive based on the total weight of the at least one layer. In some embodiments, the at least one layer comprises 0.1% to 20% by weight of the at least one additive based on the total weight of the at least one layer. In some embodiments, the at least one layer comprises 0.1% to 19% by weight of the at least one additive based on the total weight of the at least one layer. In some embodiments, the at least one layer comprises 0.1% to 18% by weight of the at least one additive based on the total weight of the at least one layer. In some embodiments, the at least one layer comprises 0.1% to 17% by weight of the at least one additive based on the total weight of the at least one layer. In some embodiments, the at least one layer comprises 0.1% to 16% by weight of the at least one additive based on the total weight of the at least one layer. In some embodiments, the at least one layer comprises 0.1% to 15% by weight of the at least one additive based on the total weight of the at least one layer. In some embodiments, the at least one layer comprises 0.1% to 14% by weight of the at least one additive based on the total weight of the at least one layer. In some embodiments, the at least one layer comprises 0.1% to 13% by weight of the at least one additive based on the total weight of the at least one layer. In some embodiments, the at least one layer comprises 0.1% to 12% by weight of the at least one additive based on the total weight of the at least one layer. In some embodiments, the at least one layer comprises 0.1% to 11% by weight of the at least one additive based on the total weight of the at least one layer. In some embodiments, the at least one layer comprises 0.1% to 10% by weight of the at least one additive based on the total weight of the at least one layer. In some embodiments, the at least one layer comprises 0.1% to 9% by weight of the at least one additive based on the total weight of the at least one layer. In some embodiments, the at least one layer comprises 0.1% to 8% by weight of the at least one additive based on the total weight of the at least one layer. In some embodiments, the at least one layer comprises 0.1% to 7% by weight of the at least one additive based on the total weight of the at least one layer. In some embodiments, the at least one layer comprises 0.1% to 6% by weight of the at least one additive based on the total weight of the at least one layer. In some embodiments, the at least one layer comprises 0.1% to 5% by weight of the at least one additive based on the total weight of the at least one layer. In some embodiments, the at least one layer comprises 0.1% to 4% by weight of the at least one additive based on the total weight of the at least one layer. In some embodiments, the at least one layer comprises 0.1% to 3% by weight of the at least one additive based on the total weight of the at least one layer. In some embodiments, the at least one layer comprises 0.1% to 2% by weight of the at least one additive based on the total weight of the at least one layer. In some embodiments, the at least one layer comprises 0.1% to 1% by weight of the at least one additive based on the total weight of the at least one layer.

In some embodiments, the at least one layer comprises 1% to 25% by weight of the at least one additive based on the total weight of the at least one layer. In some embodiments, the at least one layer comprises 2% to 25% by weight of the at least one additive based on the total weight of the at least one layer. In some embodiments, the at least one layer comprises 3% to 25% by weight of the at least one additive based on the total weight of the at least one layer. In some embodiments, the at least one layer comprises 4% to 25% by weight of the at least one additive based on the total weight of the at least one layer. In some embodiments, the at least one layer comprises 5% to 25% by weight of the at least one additive based on the total weight of the at least one layer. In some embodiments, the at least one layer comprises 6% to 25% by weight of the at least one additive based on the total weight of the at least one layer. In some embodiments, the at least one layer comprises 7% to 25% by weight of the at least one additive based on the total weight of the at least one layer. In some embodiments, the at least one layer comprises 8% to 25% by weight of the at least one additive based on the total weight of the at least one layer. In some embodiments, the at least one layer comprises 9% to 25% by weight of the at least one additive based on the total weight of the at least one layer. In some embodiments, the at least one layer comprises 10% to 25% by weight of the at least one additive based on the total weight of the at least one layer. In some embodiments, the at least one layer comprises 11% to 25% by weight of the at least one additive based on the total weight of the at least one layer. In some embodiments, the at least one layer comprises 12% to 25% by weight of the at least one additive based on the total weight of the at least one layer. In some embodiments, the at least one layer comprises 13% to 25% by weight of the at least one additive based on the total weight of the at least one layer. In some embodiments, the at least one layer comprises 14% to 25% by weight of the at least one additive based on the total weight of the at least one layer. In some embodiments, the at least one layer comprises 15% to 25% by weight of the at least one additive based on the total weight of the at least one layer. In some embodiments, the at least one layer comprises 16% to 25% by weight of the at least one additive based on the total weight of the at least one layer. In some embodiments, the at least one layer comprises 17% to 25% by weight of the at least one additive based on the total weight of the at least one layer. In some embodiments, the at least one layer comprises 18% to 25% by weight of the at least one additive based on the total weight of the at least one layer. In some embodiments, the at least one layer comprises 19% to 25% by weight of the at least one additive based on the total weight of the at least one layer. In some embodiments, the at least one layer comprises 20% to 25% by weight of the at least one additive based on the total weight of the at least one layer. In some embodiments, the at least one layer comprises 21% to 25% by weight of the at least one additive based on the total weight of the at least one layer. In some embodiments, the at least one layer comprises 22% to 25% by weight of the at least one additive based on the total weight of the at least one layer. In some embodiments, the at least one layer comprises 23% to 25% by weight of the at least one additive based on the total weight of the at least one layer. In some embodiments, the at least one layer comprises 24% to 25% by weight of the at least one additive based on the total weight of the at least one layer.

As used herein, the term "propylene," when used to modify the terms "polymer" and/or "copolymer," refers to a polymeric material (e.g., a homopolymer, a copolymer, etc.) comprising propylene units. In some embodiments, a propylene copolymer comprises a copolymer prepared by polymerizing (or copolymerizing) at least two monomers, wherein at least one of the at least two monomers comprises a propylene monomer. In some embodiments, the propylene copolymer is a copolymer comprising greater than 50% by weight (or mole percent) of polymer units derived from propylene based on a total weight (or a total moles) of the propylene copolymer.

In some embodiments, the first non-styrenic polymer comprises at least one of a homopolymer, a copolymer, or any combination thereof. In some embodiments, the first non-styrenic polymer comprises propylene units. In some embodiments, for example, the first non-styrenic polymer comprises at least one of isotactic propylene units, syndiotactic propylene units, atactic propylene units, or any combination thereof. In some embodiments, the first non-styrenic polymer comprises a first non-styrenic propylene copolymer. In some embodiments, the first non-styrenic propylene copolymer comprises at least one of an isotactic propylene copolymer, a syndiotactic propylene copolymer, an atactic propylene copolymer, a propylene impact copolymer, a statistical propylene copolymer, a random propylene copolymer, a propylene block copolymer (e.g., a di-block copolymer, a tri-block copolymer, or a multi-block copolymer having more than three blocks), or any combination thereof. In some embodiments, the first non-styrenic polymer is different from the olefin block copolymer. In some embodiments, the first non-styrenic propylene copolymer is different from the olefin block copolymer.

In some embodiments, the first non-styrenic polymer comprises the first non-styrenic propylene copolymer. In some embodiments, the first non-styrenic propylene copolymer comprises a copolymer comprising a greater weight percentage or a greater mole percentage of propylene than any other polymer units. In some embodiments, the first non-styrenic propylene copolymer comprises 51% to 100% by weight (or mole percent) of polymer units derived from propylene based on the total weight (or total moles) of the first non-styrenic propylene copolymer. In some embodiments, the first non-styrenic propylene copolymer comprises 51% to 95% by weight (or mole percent) of polymer units derived from propylene based on the total weight (or total moles) of the first non-styrenic propylene copolymer. In some embodiments, the first non-styrenic propylene copolymer comprises 51% to 90% by weight (or mole percent) of polymer units derived from propylene based on the total weight (or total moles) of the first non-styrenic propylene copolymer. In some embodiments, the first non-styrenic propylene copolymer comprises 51% to 80% by weight (or mole percent) of polymer units derived from propylene based on the total weight (or total moles) of the first non-styrenic propylene copolymer. In some embodiments, the first non-styrenic propylene copolymer comprises 51% to 70% by weight (or mole percent) of polymer units derived from propylene based on the total weight (or total moles) of the first non-styrenic propylene copolymer. In some embodiments, the first non-styrenic propylene copolymer comprises 51% to 60% by weight (or mole percent) of polymer units derived from propylene based on the total weight (or total moles) of the first non-styrenic propylene copolymer. In some embodiments, the first non-styrenic propylene copolymer comprises 60% to 99% by weight (or mole percent) of polymer units derived from propylene based on the total weight (or total moles) of the first non-styrenic propylene copolymer. In some embodiments, the first non-styrenic propylene copolymer comprises 70% to 99% by weight (or mole percent) of polymer units derived from propylene based on the total weight (or total moles) of the first non-styrenic propylene copolymer. In some embodiments, the first non-styrenic propylene copolymer comprises 80% to 99% by weight (or mole percent) of polymer units derived from propylene based on the total weight (or total moles) of the first non-styrenic propylene copolymer. In some embodiments, the weight percent (or mole percent) is based on the total weight (or total moles) of the first non-styrenic propylene copolymer based on the total weight (or total moles) of the first non-styrenic propylene copolymer.

In some embodiments, the first non-styrenic propylene copolymer comprises polymer units derived from ethylene. In some embodiments, the first non-styrenic propylene copolymer comprises less than 50% by weight (or mole percent) of polymer units derived from ethylene based on the total weight (or total moles) of the first non-styrenic propylene copolymer. In some embodiments, the first non-styrenic propylene copolymer comprises 1% to 49% by weight (or mole percent) of polymer units derived from ethylene based on the total weight (or total moles) of the first non-styrenic propylene copolymer. In some embodiments, the first non-styrenic propylene copolymer comprises 5% to 49% by weight (or mole percent) of polymer units derived from ethylene based on the total weight (or total moles) of the first non-styrenic propylene copolymer. In some embodiments, the first non-styrenic propylene copolymer comprises 10% to 49% by weight (or mole percent) of polymer units derived from ethylene based on the total weight (or total moles) of the first non-styrenic propylene copolymer. In some embodiments, the first non-styrenic propylene copolymer comprises 15% to 49% by weight (or mole percent) of polymer units derived from ethylene based on the total weight (or total moles) of the first non-styrenic propylene copolymer. In some embodiments, the first non-styrenic propylene copolymer comprises 20% to 49% by weight (or mole percent) of polymer units derived from ethylene based on the total weight (or total moles) of the first non-styrenic propylene copolymer. In some embodiments, the first non-styrenic propylene copolymer comprises 25% to 49% by weight (or mole percent) of polymer units derived from ethylene based on the total weight (or total moles) of the first non-styrenic propylene copolymer. In some embodiments, the first non-styrenic propylene copolymer comprises 30% to 49% by weight (or mole percent) of polymer units derived from ethylene based on the total weight (or total moles) of the first non-styrenic propylene copolymer. In some embodiments, the first non-styrenic propylene copolymer comprises 35% to 49% by weight (or mole percent) of polymer units derived from ethylene based on the total weight (or total moles) of the first non-styrenic propylene copolymer. In some embodiments, the first non-styrenic propylene copolymer comprises 40% to 49% by weight (or mole percent) of polymer units derived from ethylene based on the total weight (or total moles) of the first non-styrenic propylene copolymer. In some embodiments, the weight percent (or mole percent) is based on the total weight (or total moles) of the first non-styrenic propylene copolymer based on the total weight (or total moles) of the first non-styrenic propylene copolymer.

In some embodiments, the first non-styrenic propylene copolymer comprises polymer units derived from monomers and/or polymers other than ethylene. In some embodiments, the first non-styrenic propylene copolymer comprises polymer units derived from olefins (other than ethylene). For example, in some embodiments, the first non-styrenic propylene copolymer comprises polymer units derived from alpha-olefins. In some embodiments, the alpha-olefins comprise at least one of $C_2$ alpha-olefins, $C_4$-$C_{20}$ alpha-olefins, or any combination thereof. For example, in some embodiments, the first non-styrenic propylene copolymer comprises polymer units derived from at least one of $C_2$ alpha-olefins, $C_4$-$C_{20}$ alpha-olefins, $C_4$-$C_{18}$ alpha-olefins, $C_4$-$C_{20}$ alpha-olefins, $C_4$-$C_{16}$ alpha-olefins, $C_4$-$C_{14}$ alpha-olefins, $C_4$-$C_{12}$ alpha-olefins, $C_4$-$C_{10}$ alpha-olefins, $C_4$-$C_8$ alpha-olefins, $C_4$-$C_6$ alpha-olefins, $C_6$-$C_{20}$ alpha-olefins, $C_6$-$C_{18}$ alpha-olefins, $C_6$-$C_{16}$ alpha-olefins, $C_6$-$C_{14}$ alpha-olefins, $C_6$-$C_{12}$ alpha-olefins, $C_6$-$C_{10}$ alpha-olefins, $C_6$-$C_8$ alpha-olefins, $C_8$-$C_{20}$ alpha-olefins, $C_{10}$-$C_{20}$ alpha-olefins, $C_{10}$-$C_{12}$ alpha-olefins, $C_{10}$-$C_{16}$ alpha-olefins, $C_{10}$-$C_{18}$ alpha-olefins, $C_{20}$-$C_{30+}$ alpha-olefins, or any combination thereof. In some embodiments, the alpha-olefin comprises at least one of 1-butene, 2-butene, isobutylene, 1-pentene, 2-pentene, 2-methyl-1-butene, 3-methyl-1-butene, 2-methyl-2-butene, 1-hexene, 2-hexene, 3-hexene, methylpentene, dimethylbutane, 1-octene, 1-decene, 1-dodecene, 1-tetradecene, 1-hexadecene, 1-octadecene, 1-eicosene, 1-docosene, 1-tetracosene, 1-hexacosene, 1-octacosene, 1-triacontene, or any combination thereof.

In some embodiments, the second non-styrenic polymer comprises at least one of a homopolymer, a copolymer, or any combination thereof. In some embodiments, the second non-styrenic polymer comprises propylene units. In some embodiments, for example, the second non-styrenic polymer comprises at least one of isotactic propylene units, syndiotactic propylene units, atactic propylene units, or any combination thereof. In some embodiments, the second non-styrenic polymer comprises a second non-styrenic propylene copolymer. In some embodiments, the second non-styrenic propylene copolymer comprises at least one of an isotactic propylene copolymer, a syndiotactic propylene copolymer, an atactic propylene copolymer, a propylene impact copolymer, a statistical propylene copolymer, a random propylene copolymer, a propylene block copolymer (e.g., a di-block copolymer, a tri-block copolymer, or a multi-block copolymer having more than three blocks), or any combination thereof. In some embodiments, the second non-styrenic polymer is different from the olefin block copolymer. In some embodiments, the second non-styrenic propylene copolymer is different from the olefin block copolymer. In some embodiments, the second non-styrenic propylene copolymer is different from the first non-styrenic propylene copolymer. In some embodiments, the second non-styrenic polymer is different from the first non-styrenic polymer.

In some embodiments, the second non-styrenic polymer comprises the second non-styrenic propylene copolymer. In some embodiments, the second non-styrenic propylene copolymer comprises a copolymer comprising a greater weight percentage or a greater mole percentage of propylene than any other polymer units. In some embodiments, the second non-styrenic propylene copolymer comprises 51% to 100% by weight (or mole percent) of polymer units derived from propylene based on the total weight (or total moles) of the second non-styrenic propylene copolymer. In some embodiments, the second non-styrenic propylene copolymer comprises 51% to 95% by weight (or mole percent) of polymer units derived from propylene based on the total weight (or total moles) of the second non-styrenic propylene copolymer. In some embodiments, the second non-styrenic propylene copolymer comprises 51% to 90% by weight (or mole percent) of polymer units derived from propylene based on the total weight (or total moles) of the second non-styrenic propylene copolymer. In some embodiments, the second non-styrenic propylene copolymer comprises 51% to 80% by weight (or mole percent) of polymer units derived from propylene based on the total weight (or total moles) of the second non-styrenic propylene copolymer. In some embodiments, the second non-styrenic propylene copolymer comprises 51% to 70% by weight (or mole percent) of polymer units derived from propylene based on the total weight (or total moles) of the second non-styrenic propylene copolymer. In some embodiments, the second non-styrenic propylene copolymer comprises 51% to 60% by weight (or mole percent) of polymer units derived from propylene based on the total weight (or total moles) of the second non-styrenic propylene copolymer. In some embodiments, the second non-styrenic propylene copolymer comprises 60% to 99% by weight (or mole percent) of polymer units derived from propylene based on the total weight (or total moles) of the second non-styrenic propylene copolymer. In some embodiments, the second non-styrenic propylene copolymer comprises 70% to 99% by weight (or mole percent) of polymer units derived from propylene based on the total weight (or total moles) of the second non-styrenic propylene copolymer. In some embodiments, the second non-styrenic propylene copolymer comprises 80% to 99% by weight (or mole percent) of polymer units derived from propylene based on the total weight (or total moles) of the second non-styrenic propylene copolymer. In some embodiments, the weight percent (or mole percent) is based on the total weight (or total moles) of the second non-styrenic propylene copolymer based on the total weight (or total moles) of the second non-styrenic propylene copolymer.

In some embodiments, the second non-styrenic propylene copolymer comprises polymer units derived from ethylene. In some embodiments, the second non-styrenic propylene copolymer comprises less than 50% by weight (or mole percent) of polymer units derived from ethylene based on the total weight (or total moles) of the second non-styrenic propylene copolymer. In some embodiments, the second non-styrenic propylene copolymer comprises 1% to 49% by weight (or mole percent) of polymer units derived from ethylene based on the total weight (or total moles) of the second non-styrenic propylene copolymer. In some embodiments, the second non-styrenic propylene copolymer comprises 5% to 49% by weight (or mole percent) of polymer units derived from ethylene based on the total weight (or total moles) of the second non-styrenic propylene copolymer. In some embodiments, the second non-styrenic propylene copolymer comprises 10% to 49% by weight (or mole percent) of polymer units derived from ethylene based on the total weight (or total moles) of the second non-styrenic propylene copolymer. In some embodiments, the second non-styrenic propylene copolymer comprises 15% to 49% by weight (or mole percent) of polymer units derived from ethylene based on the total weight (or total moles) of the second non-styrenic propylene copolymer. In some embodiments, the second non-styrenic propylene copolymer comprises 20% to 49% by weight (or mole percent) of polymer units derived from ethylene based on the total weight (or total moles) of the second non-styrenic propylene copolymer. In some embodiments, the second non-styrenic propylene copolymer comprises 25% to 49% by weight (or mole percent) of polymer units derived from ethylene based on the total weight (or total moles) of the second non-styrenic propylene copolymer. In some embodiments, the second non-styrenic propylene copolymer comprises 30% to 49% by weight (or mole percent) of polymer units derived from ethylene based on the total weight (or total moles) of the second non-styrenic propylene copolymer. In some embodiments, the second non-styrenic propylene copolymer comprises 35% to 49% by weight (or mole percent) of polymer units derived from ethylene based on the total weight (or total moles) of the second non-styrenic propylene copolymer. In some embodiments, the second non-styrenic propylene copolymer comprises 40% to 49% by weight (or mole percent) of polymer units derived from ethylene based on the total weight (or total moles) of the second non-styrenic propylene copolymer. In some embodiments, the weight percent (or mole percent) is based on the total weight (or total moles) of the second non-styrenic propylene copolymer based on the total weight (or total moles) of the second non-styrenic propylene copolymer.

In some embodiments, the second non-styrenic propylene copolymer comprises polymer units derived from monomers and/or polymers other than ethylene. In some embodiments, the second non-styrenic propylene copolymer comprises polymer units derived from olefins (other than ethylene). For example, in some embodiments, the second non-styrenic propylene copolymer comprises polymer units derived from alpha-olefins. In some embodiments, the alpha-olefins comprise at least one of $C_2$ alpha-olefins, $C_4$-$C_{20}$ alpha-olefins, or any combination thereof. For example, in some embodiments, the second non-styrenic propylene copolymer comprises polymer units derived from at least one of $C_2$ alpha-olefins, $C_4$-$C_{20}$ alpha-olefins, $C_4$-$C_{18}$ alpha-olefins, $C_4$-$C_{20}$ alpha-olefins, $C_4$-$C_{16}$ alpha-olefins, $C_4$-$C_{14}$ alpha-olefins, $C_4$-$C_{12}$ alpha-olefins, $C_4$-$C_{10}$ alpha-olefins, $C_4$-$C_8$ alpha-olefins, $C_4$-$C_6$ alpha-olefins, $C_6$-$C_{20}$ alpha-olefins, $C_6$-$C_{18}$ alpha-olefins, $C_6$-$C_{16}$ alpha-olefins, $C_6$-$C_{14}$ alpha-olefins, $C_6$-$C_{12}$ alpha-olefins, $C_6$-$C_{10}$ alpha-olefins, $C_6$-$C_8$ alpha-olefins, $C_8$-$C_{20}$ alpha-olefins, $C_{10}$-$C_{20}$ alpha-olefins, $C_{10}$-$C_{12}$ alpha-olefins, $C_{10}$-$C_{16}$ alpha-olefins, $C_{10}$-$C_{18}$ alpha-olefins, $C_{20}$-$C_{30+}$ alpha-olefins, or any combination thereof. In some embodiments, the alpha-olefin comprises at least one of 1-butene, 2-butene, isobutylene, 1-pentene, 2-pentene, 2-methyl-1-butene, 3-methyl-1-butene, 2-methyl-2-butene, 1-hexene, 2-hexene, 3-hexene, methylpentene, dimethylbutane, 1-octene, 1-decene, 1-dodecene, 1-tetradecene, 1-hexadecene, 1-octadecene, 1-eicosene, 1-docosene, 1-tetracosene, 1-hexacosene, 1-octacosene, 1-triacontene, or any combination thereof.

It will be appreciated that other types of non-styrenic polymers may be used herein, without departing from the scope of this disclosure. For example, in some embodiments, the non-styrenic polymer comprises a non-styrenic ethylene copolymer.

In some embodiments, the at least one additive comprises at least one of a colorant, an antioxidant, an ultraviolet stabilizer, a processing aid, a fire retardant, or any combination thereof.

In some embodiments, the colorant comprises at least one of a pigment, a dye, or any combination thereof. In some embodiments, the colorant comprises at least one of a reflective pigment, a transition metal oxide, a cool pigment, a metallic pigment, a metallic particle, a mirrored pigment, a light scattering additive, an opacifier, a thin-film coated particle, a near infrared-reflecting pigment, light-interference platelet pigment, a silica pigment, a metal flake pigment, an inorganic pigment, or any combination thereof. Non-limiting examples of pigments and dyes include, without limitation, at least one of an infrared reflective pigment/dye, a phosphorescence pigment/dye, a fluorescence pigment/dye, or any combination thereof. In some embodiments, the colorant comprises at least one of $TiO_2$, alumina, silica, iron oxide, tin oxide, $SiO_2$, aluminum oxide, mica, rutile, anatase, alloys, aluminum, iron, copper, brass, titanium, cobalt, stainless steel, chromium, nickel, or any combination thereof. In some embodiments, the colorant comprises water. In some embodiments, the pigment comprises at least one of zinc oxide, antimony oxide, zirconium oxide, chromium oxide, iron oxide, lead oxide, zinc sulfide, titanium dioxide (anatase, rutile, or brookite), lithopone, and carbon black, or any combination thereof.

Some examples of commercially available materials suitable for inclusion in the at least one layer include, without limitation, at least one of Colonial Red, which is a reflective pigment that is available from Americhem Inc., Cuyahoga Falls, Ohio; Ti Pure™ Titanium Dioxide from Chemours, Wilmington, Delaware; pigments available from Wenzhou Pearlescent Pigments Co., Ltd., No. 9 Small East District, Wenzhou Economical and Technical Development Zone, Peoples Republic of China, such as Taizhu TZ5013 (mica, rutile titanium dioxide and iron oxide, golden color), TZ5012 (mica, rutile titanium dioxide and iron oxide, golden color), TZ4013 (mica and iron oxide, wine red color), TZ4012 (mica and iron oxide, red brown color), TZ4011 (mica and iron oxide, bronze color), TZ2015 (mica and rutile titanium dioxide, interference green color), TZ2014 (mica and rutile titanium dioxide, interference blue color), TZ2013 (mica and rutile titanium dioxide, interference violet color), TZ2012 (mica and rutile titanium dioxide, interference red color), TZ2011 (mica and rutile titanium dioxide, interference golden color), TZ1222 (mica and rutile titanium dioxide, silver white color), TZ1004 (mica and anatase titanium dioxide, silver white color), TZ4001/600 (mica and iron oxide, bronze appearance), TZ5003/600 (mica, titanium oxide and iron oxide, gold appearance), TZ1001/80 (mica and titanium dioxide, off-white appearance), TZ2001/600 (mica, titanium dioxide, tin oxide, off-white/gold appearance), TZ2004/600 (mica, titanium dioxide, tin oxide, off-white/blue appearance), TZ2005/600 (mica, titanium dioxide, tin oxide, off-white/green appearance), TZ4002/600 (mica and iron oxide, bronze appearance); pigments available from Merck KGaA, Darmstadt, Germany, such as Iriodin® pearlescent pigment based on mica covered with a thin layer of titanium dioxide and/or iron oxide; Xirallic™ high chroma crystal effect pigment based upon aluminum oxide platelets coated with metal oxides, including Xirallic T 60-10 WNT crystal silver, Xirallic T 60-20 WNT sunbeam gold, and Xirallic F 60-50 WNT fireside copper; ColorStream™ multi color effect pigments based on SiO2 platelets coated with metal oxides, including ColorStream F 20-00 WNT autumn mystery and ColorStream F 20-07 WNT viola fantasy; Chrom Brite™ CB4500, available from Bead Brite, 400 Oser Ave, Suite 600, Hauppauge, N.Y. 11788; pigments available from Color Division of Ferro Corporation, 4150 East 56th St., Cleveland, Ohio 44101, and produced using high temperature calcinations, including PC-9415 Yellow, PC-9416 Yellow, PC-9158 Autumn Gold, PC-9189 Bright Golden Yellow, V-9186 Iron-Free Chestnut Brown, V-780 Black, V0797 IR Black, V-9248 Blue, PC-9250 Bright Blue, PC-5686 Turquoise, V-13810 Red, V-12600 Camouflage Green, V12560 IR Green, V-778 IR Black, and V-799 Black.

In some embodiments, the antioxidant comprises at least one of a hindered phenolic antioxidant, an organophosphate antioxidant, an aromatic amine antioxidant, or any combination thereof. Non-limiting examples of antioxidants include, for example and without limitation, at least one of the hindered phenolic antioxidants, such as, the Irganox® family of antioxidants (available from BASF, Florham Park, N.J., US) and the Anox® family of antioxidants (available from Addivant, Danbury, Conn., US); organophosphite antioxidants, such as, the Irgofos® family of antioxidants (available from BASF, Florham Park, N.J., US) and the Ultranox® family of antioxidants (available from Addivant, Danbury, Conn., US); and the aromatic amine antioxidants such as the Naugard® family of antioxidants (available from Addivant, Danbury, Conn., US) and Agerite® Stalite® family of antioxidants (available from Vanderbilt Chemicals, LLC, Norwalk, Conn., US).

In some embodiments, the ultraviolet stabilizer comprises at least one of phenols, benzophenones, benzotriazoles, aryl esters, oxanilides, acrylic esters, sebacates, formamidine, carbon black, hindered amines, nickel quenchers, hindered amines, phenolic antioxidants, metallic salts, zinc compounds, or any combination thereof. Non-limiting examples of ultraviolet stabilizers include, for example and without limitation, the TINUVIN® family of ultraviolet stabilizers (available from Ciba Specialty Chemicals of Tarrytown, N.Y., US) and other ultraviolet stabilizers available from a variety of manufacturers, such as, E.I. du Pont de Nemours and the like.

In some embodiments, the processing aid comprises at least one of polyols, oils, waxes, fatty acids, salts of fatty acids, esters of fatty acids, or any combination thereof. In some embodiments, the processing aid comprises at least one of glycerol, 1,2,4-butanetriol, 1,4-butanediol, 1,2-propanediol, 1,3-propanediol, poly(ethylene glycol), ethylenebis-stearamide (EBS), stearamide, oleamide, erucamide, or N,N'-ethylene bis-stearamide, polyethylene wax, oxidized polyethylene wax, polymers of ethylene oxide, copolymers of ethylene oxide and propylene oxide, vegetable oils, hydrocarbon oils, paraffin oils, vegetable waxes, petroleum waxes, non-ionic surfactants, silicone fluids, polysiloxanes, fluoroelastomers, recinoleic acid, stearic acid, palmitic acid, lauric acid, barium stearate, zinc stearate, calcium stearate, recinoleates, stearates, palmitates, laurates, silica, or any combination thereof.

In some embodiments, the fire retardant comprises at least one of a halogenated fire retardant, a polyphosphate, a magnesium hydroxide, a chlorinated olefin, a chlorinated paraffin, or any combination thereof. In some embodiments, the fire retardant comprises at least one of a phosphate, a phosphorus, a phosphite, a hypophosphite, a melamine, a clay, a metal hydroxide, a metal oxide, a borate, a urea, or any combination thereof. In some embodiments, the fire retardant comprises at least one of an ammonium pyrophosphate, an ammonium polyphosphate, a diethyl phosphinate, an ethylene diamine phosphate, a melamine pyrophosphate, a melamine polyzinc phosphate, a melamine polymagnesium phosphate, a melamine zinc phosphate, a piperazine phosphate, a pyrophosphoric acid salt, a hydroxyphenyl phosphinyl propanoic acid, a magnesium hydroxide, a magnesium dihydroxide, an alumina trihydrate, a melamine cyanurate, a zinc borate, a manganese borate, an ammonium borate, a lead borate, an expandable graphite, a graphene, tetrabromobisphenol A, decabromodiphenyl oxide, antimony trioxide, a phosphate ester, or any combination thereof.

In some embodiments, the at least one first layer does not comprise an olefin block copolymer. In some embodiments, the olefin block copolymer is different from the first non-styrenic polymer. In some embodiments, the olefin block copolymer is different from the first non-styrenic propylene copolymer. In some embodiments, the olefin block copolymer is different from the second non-styrenic polymer. In some embodiments, the olefin block copolymer is different from the second non-styrenic propylene copolymer. In some embodiments, when the first non-styrenic polymer and/or the second non-styrenic polymer are present, the at least one layer does not comprise an olefin block copolymer, wherein the olefin block copolymer is different from the first non-styrenic polymer and/or the second non-styrenic polymer.

In some embodiments, the at least one first layer comprises a filler. In some embodiments, the filler comprises at least one of glass, calcium carbonate, barium sulfate, calcium sulfate, talc, perlite, silica, fumed silica, precipitated silica, quartz, aluminum trihydrate, magnesium hydroxide, ammonium polyphosphate, colemanite, titanium dioxide, calcium sulfate, fly ash, graphene nanoparticles, carbon black, recycled materials (e.g., such as one or more of recycled rubber tires, recycled shingles, recycled thermoplastic resins), basalt, roofing granules, graphite, clay, or any combination thereof. In some embodiments, the at least one first layer does not comprise a filler. In some embodiments, for example, the at least one first layer does not comprise a limestone. In some embodiments, the at least one first layer does not comprise a fire retardant. For example, in some embodiments, the at least one first layer does not comprise a magnesium dihydroxide compound (e.g., Mg(OH)$_2$).

In some embodiments, the at least one first layer has a thickness of 1 mil to 100 mils. In some embodiments, the at least one first layer has a thickness of 1 mil to 95 mils. In some embodiments, the at least one first layer has a thickness of 1 mil to 90 mils. In some embodiments, the at least one first layer has a thickness of 1 mil to 85 mils. In some embodiments, the at least one first layer has a thickness of 1 mil to 80 mils. In some embodiments, the at least one first layer has a thickness of 1 mil to 75 mils. In some embodiments, the at least one first layer has a thickness of 1 mil to 70 mils. In some embodiments, the at least one first layer has a thickness of 1 mil to 65 mils. In some embodiments, the at least one first layer has a thickness of 1 mil to 60 mils. In some embodiments, the at least one first layer has a thickness of 1 mil to 55 mils. In some embodiments, the at least one first layer has a thickness of 1 mil to 50 mils. In some embodiments, the at least one first layer has a thickness of 1 mil to 45 mils. In some embodiments, the at least one first layer has a thickness of 1 mil to 40 mils. In some embodiments, the at least one first layer has a thickness of 1 mil to 35 mils. In some embodiments, the at least one first layer has a thickness of 1 mil to 30 mils. In some embodiments, the at least one first layer has a thickness of 1 mil to 25 mils. In some embodiments, the at least one first layer has a thickness of 1 mil to 20 mils. In some embodiments, the at least one first layer has a thickness of 1 mil to 15 mils. In some embodiments, the at least one first layer has a thickness of 1 mil to 10 mils. In some embodiments, the at least one first layer has a thickness of 1 mil to 5 mils.

In some embodiments, the at least one first layer has a thickness of 5 mils to 100 mils. In some embodiments, the at least one first layer has a thickness of 10 mils to 100 mils. In some embodiments, the at least one first layer has a thickness of 15 mils to 100 mils. In some embodiments, the at least one first layer has a thickness of 20 mils to 100 mils. In some embodiments, the at least one first layer has a thickness of 25 mils to 100 mils. In some embodiments, the at least one first layer has a thickness of 30 mils to 100 mils. In some embodiments, the at least one first layer has a thickness of 35 mils to 100 mils. In some embodiments, the at least one first layer has a thickness of 40 mils to 100 mils. In some embodiments, the at least one first layer has a thickness of 45 mils to 100 mils. In some embodiments, the at least one first layer has a thickness of 50 mils to 100 mils. In some embodiments, the at least one first layer has a thickness of 55 mils to 100 mils. In some embodiments, the at least one first layer has a thickness of 60 mils to 100 mils. In some embodiments, the at least one first layer has a thickness of 65 mils to 100 mils. In some embodiments, the at least one first layer has a thickness of 70 mils to 100 mils. In some embodiments, the at least one first layer has a thickness of 75 mils to 100 mils. In some embodiments, the at least one first layer has a thickness of 80 mils to 100 mils. In some embodiments, the at least one first layer has a thickness of 85 mils to 100 mils. In some embodiments, the at least one first layer has a thickness of 90 mils to 100 mils. In some embodiments, the at least one first layer has a thickness of 95 mils to 100 mils.

In some embodiments, the at least one first layer consists essentially of the first non-styrenic polymer, the second non-styrenic polymer, and optionally the at least one additive, wherein the at least one additive comprises at least one of a colorant, an antioxidant, an ultraviolet stabilizer, a processing aid, a fire retardant, or any combination thereof. In some embodiments, the roofing material consists essentially of the at least one first layer, optionally the reinforcement layer, optionally the adhesive layer, and optionally the release liner, wherein the at least one first layer comprises or consists essentially of the first non-styrenic polymer, the second non-styrenic polymer, and the at least one additive, wherein the at least one additive comprises at least one of a colorant, an antioxidant, an ultraviolet stabilizer, a processing aid, a fire retardant, or any combination thereof.

In some embodiments, the roofing material does not comprise an olefin block copolymer. In some embodiments, the roofing material does not comprise a fire retardant. In some embodiments, the roofing material does not comprise a filler. In some embodiments, the roofing material does not comprise a limestone. In some embodiments, the roofing material does not comprise a magnesium dihydroxide compound (e.g., $Mg(OH)_2$).

In some embodiments, the roofing material comprises a reinforcement layer.

In some embodiments, the first layer is located on the reinforcement layer. In some embodiments, the reinforcement layer is embedded in the at least one at least one layer. In some embodiments, the reinforcement layer is located on a bottom surface of the at least one layer. In some embodiments, the at least one layer is located on a top surface of the reinforcement layer. In some embodiments, the at least one layer directly contacts a top surface of the reinforcement layer. In some embodiments, the at least one layer is located on a bottom surface of the reinforcement layer. In some embodiments, the at least one layer directly contacts a bottom surface of the reinforcement layer. In some embodiments, the at least one layer impregnates the reinforcement layer. In some embodiments, the reinforcement layer is located on a top surface of the at least one layer. In some embodiments, the reinforcement layer is located between a first layer and a second layer. In some embodiments, the reinforcement layer directly contacts the first layer and the second layer. In some embodiments, an intervening layer is located between the reinforcement layer and the first layer. In some embodiments, the intervening layer is located between the reinforcement layer and the second layer. In some embodiments, the roofing material does not comprise a reinforcement layer.

In some embodiments, the reinforcement layer is a support layer. In some embodiments, the reinforcement layer comprises at least one of a mesh, a fabric, a fleece, a mat (a woven mat, an unwoven mat, etc.), a scrim, a coated scrim, a woven, a non-woven, or any combination thereof. In some embodiments, the reinforcement layer comprises at least one of a spunbond mat, a spunlaced mat, an airlaid mat, a meltblown mat, or any combination thereof. In some embodiments, the reinforcement layer comprises a fibrous material, wherein the fibrous material comprises at least one of a natural fiber, a synthetic fiber, or any combination thereof. In some embodiments, the reinforcement layer comprises at least one of a polyolefin (e.g., at least one of a polyethylene, a propylene, any copolymer thereof, any blend thereof, or any combination thereof), a polyester, a polyamide, a glass, a fiberglass, or any combination thereof.

In some embodiments, the reinforcement layer has a thickness of 1 mil to 60 mils. In some embodiments, the reinforcement layer has a thickness of 1 mil to 55 mils. In some embodiments, the reinforcement layer has a thickness of 1 mil to 50 mils. In some embodiments, the reinforcement layer has a thickness of 1 mil to 45 mils. In some embodiments, the reinforcement layer has a thickness of 1 mil to 40 mils. In some embodiments, the reinforcement layer has a thickness of 1 mil to 35 mils. In some embodiments, the reinforcement layer has a thickness of 1 mil to 30 mils. In some embodiments, the reinforcement layer has a thickness of 1 mil to 25 mils. In some embodiments, the reinforcement layer has a thickness of 1 mil to 20 mils. In some embodiments, the reinforcement layer has a thickness of 1 mil to 15 mils. In some embodiments, the reinforcement layer has a thickness of 1 mil to 10 mils. In some embodiments, the reinforcement layer has a thickness of 1 mil to 5 mils.

In some embodiments, the reinforcement layer has a thickness of 5 mils to 60 mils. In some embodiments, the reinforcement layer has a thickness of 10 mils to 60 mils. In some embodiments, the reinforcement layer has a thickness of 15 mils to 60 mils. In some embodiments, the reinforcement layer has a thickness of 20 mils to 60 mils. In some embodiments, the reinforcement layer has a thickness of 25 mils to 60 mils. In some embodiments, the reinforcement layer has a thickness of 30 mils to 60 mils. In some embodiments, the reinforcement layer has a thickness of 35 mils to 60 mils. In some embodiments, the reinforcement layer has a thickness of 40 mils to 60 mils. In some embodiments, the reinforcement layer has a thickness of 45 mils to 60 mils. In some embodiments, the reinforcement layer has a thickness of 50 mils to 60 mils. In some embodiments, the reinforcement layer has a thickness of 55 mils to 60 mils.

In some embodiments, the roofing material comprises an adhesive layer. In some embodiments, the adhesive layer covers at least a portion of the at least one layer. In some embodiments, the adhesive layer covers an entire surface of the at least one layer. In some embodiments, the adhesive layer covers at least a portion of the reinforcement layer. In some embodiments, the adhesive layer covers an entire surface of the reinforcement layer. In some embodiments, the adhesive layer is located between the at least one layer and a release liner. In some embodiments, the adhesive layer is located between the reinforcement layer and a release liner. In some embodiments, the adhesive layer directly contacts the at least one layer. In some embodiments, the adhesive layer directly contacts the reinforcement layer. In some embodiments, the adhesive layer is located between at least two of the at least one layer. In some embodiments, when the roofing material is installed on a roofing substrate, the adhesive layer adheres the roofing material to the roofing substrate. In some embodiments, the roofing material does not comprise an adhesive layer.

In some embodiments, the adhesive layer comprises at least one adhesive. In some embodiments, the at least one adhesive comprises at least one of a hot melt adhesive, a solvent-based adhesive, a pressure sensitive adhesive, a water-based adhesive, a UV cured or UV curable polymer, or any combination thereof. In some embodiments, the at least one adhesive comprises at least one of an asphaltic adhesive, a butyl adhesive, a silicone adhesive, an acrylic adhesive, a synthetic thermoplastic elastomer, a natural rubber, or any combination thereof. In some embodiments, the at least one adhesive comprises at least one of thermosetting polyolefin, thermoplastic polyolefin (TPO), polyvinyl butyrate, silicone, polycarbonate, butyl rubber, styrene-butadiene-styrene (SBS), styrene-isoprene-styrene (SIS), styrene butadiene (SB), styrene-ethylene-butadiene-styrene (SEBS), ethylene vinyl acetate (EVA), a resin, a hydrocarbon resin, a rosin resin, a natural wax, a petroleum wax, an oil, bitumen, a solvent, vinyl acetate, an acrylic polymers, an acrylic copolymer, (e.g., at least one of vinyl acetate acrylic, ethylene vinyl acetate, styrene acrylic, vinyl chloride acrylic, vinyl versatate, or any combination thereof), or any combination thereof. In some embodiments, the at least one adhesive comprises at one elastomer. In some embodiments, the at least one elastomer comprises at least one of a butyl rubber, a styrenic block copolymer, or any combination thereof.

In some embodiments, the at least one adhesive comprises at least one of an asphaltic adhesive, a butyl adhesive, a silicone adhesive, an epoxy adhesive, a polyurethane adhesive, an acrylic adhesive, or any combination thereof. In some embodiments, the at least one adhesive comprises at least one of thermosetting polyolefin, thermoplastic polyolefin (TPO), polyvinyl butyrate, silicone, polycarbonate, butyl rubber, styrene, styrene-butadiene-styrene (SBS), styrene-isoprene-styrene (SIS), styrene butadiene (SB), styrene-ethylene-butadiene-styrene (SEBS), ethylene vinyl acetate (EVA), a resin, a hydrocarbon resin, a rosin resin, a natural wax, a petroleum wax, an oil, bitumen, a solvent, vinyl acetate, an acrylic polymer, an acrylic copolymer, (e.g., at least one of vinyl acetate acrylic, ethylene vinyl acetate, an ethylene acrylic, styrene acrylic, vinyl chloride acrylic, vinyl versatate, or any combination thereof), a silyl modified polymer, a silane terminated polymer, natural rubber, a polyolefin polymer, a poly-alpha-olefin (APAO/APO) polymer, a polyamide polyvinyl acetate, a polyvinyl alcohol, a polyamide, a polyester, a polyester amide, or any combination thereof.

In some embodiments, the adhesive layer has a thickness of 1 mil to 60 mils. In some embodiments, the adhesive layer has a thickness of 1 mil to 55 mils. In some embodiments, the adhesive layer has a thickness of 1 mil to 50 mils. In some embodiments, the adhesive layer has a thickness of 1 mil to 45 mils. In some embodiments, the adhesive layer has a thickness of 1 mil to 40 mils. In some embodiments, the adhesive layer has a thickness of 1 mil to 35 mils. In some embodiments, the adhesive layer has a thickness of 1 mil to 30 mils. In some embodiments, the adhesive layer has a thickness of 1 mil to 25 mils. In some embodiments, the adhesive layer has a thickness of 1 mil to 20 mils. In some embodiments, the adhesive layer has a thickness of 1 mil to 15 mils. In some embodiments, the adhesive layer has a thickness of 1 mil to 10 mils. In some embodiments, the adhesive layer has a thickness of 1 mil to 5 mils.

In some embodiments, the adhesive layer has a thickness of 5 mils to 60 mils. In some embodiments, the adhesive layer has a thickness of 10 mils to 60 mils. In some embodiments, the adhesive layer has a thickness of 15 mils to 60 mils. In some embodiments, the adhesive layer has a thickness of 20 mils to 60 mils. In some embodiments, the adhesive layer has a thickness of 25 mils to 60 mils. In some embodiments, the adhesive layer has a thickness of 30 mils to 60 mils. In some embodiments, the adhesive layer has a thickness of 35 mils to 60 mils. In some embodiments, the adhesive layer has a thickness of 40 mils to 60 mils. In some embodiments, the adhesive layer has a thickness of 45 mils to 60 mils. In some embodiments, the adhesive layer has a thickness of 50 mils to 60 mils. In some embodiments, the adhesive layer has a thickness of 55 mils to 60 mils.

In some embodiments, the roofing material comprises a release liner. In some embodiments, the release liner covers at least a portion of the adhesive layer. In some embodiments, the release liner covers an entire surface of the adhesive layer. In some embodiments, the adhesive layer is located between the first layer and the release liner. In some embodiments, the roofing material does not comprise a release liner.

In some embodiments, the roofing material has a thickness of 1 mil to 100 mils. In some embodiments, the roofing material has a thickness of 1 mil to 95 mils. In some embodiments, the roofing material has a thickness of 1 mil to 90 mils. In some embodiments, the roofing material has a thickness of 1 mil to 85 mils. In some embodiments, the roofing material has a thickness of 1 mil to 80 mils. In some embodiments, the roofing material has a thickness of 1 mil to 75 mils. In some embodiments, the roofing material has a thickness of 1 mil to 70 mils. In some embodiments, the roofing material has a thickness of 1 mil to 65 mils. In some embodiments, the roofing material has a thickness of 1 mil to 60 mils. In some embodiments, the roofing material has a thickness of 1 mil to 55 mils. In some embodiments, the roofing material has a thickness of 1 mil to 50 mils. In some embodiments, the roofing material has a thickness of 1 mil to 45 mils. In some embodiments, the roofing material has a thickness of 1 mil to 40 mils. In some embodiments, the roofing material has a thickness of 1 mil to 35 mils. In some embodiments, the roofing material has a thickness of 1 mil to 30 mils. In some embodiments, the roofing material has a thickness of 1 mil to 25 mils. In some embodiments, the roofing material has a thickness of 1 mil to 20 mils. In some embodiments, the roofing material has a thickness of 1 mil to 15 mils. In some embodiments, the roofing material has a thickness of 1 mil to 10 mils. In some embodiments, the roofing material has a thickness of 1 mil to 5 mils.

In some embodiments, the roofing material has a thickness of 5 mils to 100 mils. In some embodiments, the roofing material has a thickness of 10 mils to 100 mils. In some embodiments, the roofing material has a thickness of 15 mils to 100 mils. In some embodiments, the roofing material has a thickness of 20 mils to 100 mils. In some embodiments, the roofing material has a thickness of 25 mils to 100 mils. In some embodiments, the roofing material has a thickness of 30 mils to 100 mils. In some embodiments, the roofing material has a thickness of 35 mils to 100 mils. In some embodiments, the roofing material has a thickness of 40 mils to 100 mils. In some embodiments, the roofing material has a thickness of 45 mils to 100 mils. In some embodiments, the roofing material has a thickness of 50 mils to 100 mils. In some embodiments, the roofing material has a thickness of 55 mils to 100 mils. In some embodiments, the roofing material has a thickness of 60 mils to 100 mils. In some embodiments, the roofing material has a thickness of 65 mils to 100 mils. In some embodiments, the roofing material has a thickness of 70 mils to 100 mils. In some embodiments, the roofing material has a thickness of 75 mils to 100 mils. In some embodiments, the roofing material has a thickness of 80 mils to 100 mils. In some embodiments, the roofing material has a thickness of 85 mils to 100 mils. In some embodiments, the roofing material has a thickness of 90 mils to 100 mils. In some embodiments, the roofing material has a thickness of 95 mils to 100 mils.

In some embodiments, the roofing material, when tested according to ASTM D638, exhibits a tensile modulus of 35 MPa or less in a machine direction. In some embodiments, the roofing material, when tested according to ASTM D638, exhibits a tensile modulus of 1 MPa to 35 MPa in the machine direction. In some embodiments, the roofing material, when tested according to ASTM D638, exhibits a tensile modulus of 1 MPa to 34 MPa in the machine direction. In some embodiments, the roofing material, when tested according to ASTM D638, exhibits a tensile modulus of 1 MPa to 33 MPa in the machine direction. In some embodiments, the roofing material, when tested according to ASTM D638, exhibits a tensile modulus of 1 MPa to 32 MPa in the machine direction. In some embodiments, the roofing material, when tested according to ASTM D638, exhibits a tensile modulus of 1 MPa to 31 MPa in the machine direction. In some embodiments, the roofing material, when tested according to ASTM D638, exhibits a tensile modulus of 1 MPa to 30 MPa in the machine direction. In some embodiments, the roofing material, when tested according to ASTM D638, exhibits a tensile modulus of 1 MPa to 29 MPa in the machine direction. In some embodiments, the roofing material, when tested according to ASTM D638, exhibits a tensile modulus of 1 MPa to 28 MPa in the machine direction. In some embodiments, the roofing material, when tested according to ASTM D638, exhibits a tensile modulus of 1 MPa to 27 MPa in the machine direction. In some embodiments, the roofing material, when tested according to ASTM D638, exhibits a tensile modulus of 1 MPa to 26 MPa in the machine direction. In some embodiments, the roofing material, when tested according to ASTM D638, exhibits a tensile modulus of 1 MPa to 25 MPa in the machine direction. In some embodiments, the roofing material, when tested according to ASTM D638, exhibits a tensile modulus of 1 MPa to 24 MPa in the machine direction. In some embodiments, the roofing material, when tested according to ASTM D638, exhibits a tensile modulus of 1 MPa to 23 MPa in the machine direction. In some embodiments, the roofing material, when tested according to ASTM D638, exhibits a tensile modulus of 1 MPa to 22 MPa in the machine direction. In some embodiments, the roofing material, when tested according to ASTM D638, exhibits a tensile modulus of 1 MPa to 21 MPa in the machine direction. In some embodiments, the roofing material, when tested according to ASTM D638, exhibits a tensile modulus of 1 MPa to 20 MPa in the machine direction. In some embodiments, the roofing material, when tested according to ASTM D638, exhibits a tensile modulus of 1 MPa to 19 MPa in the machine direction. In some embodiments, the roofing material, when tested according to ASTM D638, exhibits a tensile modulus of 1 MPa to 18 MPa in the machine direction. In some embodiments, the roofing material, when tested according to ASTM D638, exhibits a tensile modulus of 1 MPa to 17 MPa in the machine direction. In some embodiments, the roofing material, when tested according to ASTM D638, exhibits a tensile modulus of 1 MPa to 16 MPa in the machine direction. In some embodiments, the roofing material, when tested according to ASTM D638, exhibits a tensile modulus of 1 MPa to 15 MPa in the machine direction. In some embodiments, the roofing material, when tested according to ASTM D638, exhibits a tensile modulus of 1 MPa to 14 MPa in the machine direction. In some embodiments, the roofing material, when tested according to ASTM D638, exhibits a tensile modulus of 1 MPa to 13 MPa in the machine direction. In some embodiments, the roofing material, when tested according to ASTM D638, exhibits a tensile modulus of 1 MPa to 12 MPa in the machine direction. In some embodiments, the roofing material, when tested according to ASTM D638, exhibits a tensile modulus of 1 MPa to 11 MPa in the machine direction. In some embodiments, the roofing material, when tested according to ASTM D638, exhibits a tensile modulus of 1 MPa to 10 MPa in the machine direction. In some embodiments, the roofing material, when tested according to ASTM D638, exhibits a tensile modulus of 1 MPa to 9 MPa in the machine direction. In some embodiments, the roofing material, when tested according to ASTM D638, exhibits a tensile modulus of 1 MPa to 8 MPa in the machine direction. In some embodiments, the roofing material, when tested according to ASTM D638, exhibits a tensile modulus of 1 MPa to 7 MPa in the machine direction. In some embodiments, the roofing material, when tested according to ASTM D638, exhibits a tensile modulus of 1 MPa to 6 MPa in the machine direction. In some embodiments, the roofing material, when tested according to ASTM D638, exhibits a tensile modulus of 1 MPa to 5 MPa in the machine direction. In some embodiments, the roofing material, when tested according to ASTM D638, exhibits a tensile modulus of 1 MPa to 4 MPa in the machine direction. In some embodiments, the roofing material, when tested according to ASTM D638, exhibits a tensile modulus of 1 MPa to 3 MPa in the machine direction. In some embodiments, the roofing material, when tested according to ASTM D638, exhibits a tensile modulus of 1 MPa to 2 MPa in the machine direction.

In some embodiments, the roofing material, when tested according to ASTM D638, exhibits a tensile modulus of 2 MPa to 35 MPa in the machine direction. In some embodiments, the roofing material, when tested according to ASTM D638, exhibits a tensile modulus of 3 MPa to 35 MPa in the machine direction. In some embodiments, the roofing material, when tested according to ASTM D638, exhibits a tensile modulus of 4 MPa to 35 MPa in the machine direction. In some embodiments, the roofing material, when tested according to ASTM D638, exhibits a tensile modulus of 5 MPa to 35 MPa in the machine direction. In some embodiments, the roofing material, when tested according to ASTM D638, exhibits a tensile modulus of 6 MPa to 35 MPa in the machine direction. In some embodiments, the roofing material, when tested according to ASTM D638, exhibits a tensile modulus of 7 MPa to 35 MPa in the machine direction. In some embodiments, the roofing material, when tested according to ASTM D638, exhibits a tensile modulus of 8 MPa to 35 MPa in the machine direction. In some embodiments, the roofing material, when tested according to ASTM D638, exhibits a tensile modulus of 9 MPa to 35 MPa in the machine direction. In some embodiments, the roofing material, when tested according to ASTM D638, exhibits a tensile modulus of 10 MPa to 35 MPa in the machine direction. In some embodiments, the roofing material, when tested according to ASTM D638, exhibits a tensile modulus of 11 MPa to 35 MPa in the machine direction. In some embodiments, the roofing material, when tested according to ASTM D638, exhibits a tensile modulus of 12 MPa to 35 MPa in the machine direction. In some embodiments, the roofing material, when tested according to ASTM D638, exhibits a tensile modulus of 13 MPa to 35 MPa in the machine direction. In some embodiments, the roofing material, when tested according to ASTM D638, exhibits a tensile modulus of 14 MPa to 35 MPa in the machine direction. In some embodiments, the roofing material, when tested according to ASTM D638, exhibits a tensile modulus of 15 MPa to 35 MPa in the machine direction. In some embodiments, the roofing material, when tested according to ASTM D638, exhibits a tensile modulus of 16 MPa to 35 MPa in the machine direction. In some embodiments, the roofing material, when tested according to ASTM D638, exhibits a tensile modulus of 17 MPa to 35 MPa in the machine direction. In some embodiments, the roofing material, when tested according to ASTM D638, exhibits a tensile modulus of 18 MPa to 35 MPa in the machine direction. In some embodiments, the roofing material, when tested according to ASTM D638, exhibits a tensile modulus of 19 MPa to 35 MPa in the machine direction. In some embodiments, the roofing material, when tested according to ASTM D638, exhibits a tensile modulus of 20 MPa to 35 MPa in the machine direction. In some embodiments, the roofing material, when tested according to ASTM D638, exhibits a tensile modulus of 21 MPa to 35 MPa in the machine direction. In some embodiments, the roofing material, when tested according to ASTM D638, exhibits a tensile modulus of 22 MPa to 35 MPa in the machine direction. In some embodiments, the roofing material, when tested according to ASTM D638, exhibits a tensile modulus of 23 MPa to 35 MPa in the machine direction. In some embodiments, the roofing material, when tested according to ASTM D638, exhibits a tensile modulus of 24 MPa to 35 MPa in the machine direction. In some embodiments, the roofing material, when tested according to ASTM D638, exhibits a tensile modulus of 25 MPa to 35 MPa in the machine direction. In some embodiments, the roofing material, when tested according to ASTM D638, exhibits a tensile modulus of 26 MPa to 35 MPa in the machine direction. In some embodiments, the roofing material, when tested according to ASTM D638, exhibits a tensile modulus of 27 MPa to 35 MPa in the machine direction. In some embodiments, the roofing material, when tested according to ASTM D638, exhibits a tensile modulus of 28 MPa to 35 MPa in the machine direction. In some embodiments, the roofing material, when tested according to ASTM D638, exhibits a tensile modulus of 29 MPa to 35 MPa in the machine direction. In some embodiments, the roofing material, when tested according to ASTM D638, exhibits a tensile modulus of 30 MPa to 35 MPa in the machine direction. In some embodiments, the roofing material, when tested according to ASTM D638, exhibits a tensile modulus of 31 MPa to 35 MPa in the machine direction. In some embodiments, the roofing material, when tested according to ASTM D638, exhibits a tensile modulus of 32 MPa to 35 MPa in the machine direction. In some embodiments, the roofing material, when tested according to ASTM D638, exhibits a tensile modulus of 33 MPa to 35 MPa in the machine direction. In some embodiments, the roofing material, when tested according to ASTM D638, exhibits a tensile modulus of 34 MPa to 35 MPa in the machine direction.

In some embodiments, the roofing material, when tested according to ASTM D638, exhibits a tensile modulus of 20 MPa or less in the cross-machine direction. In some embodiments, the roofing material, when tested according to ASTM D638, exhibits a tensile modulus of 1 MPa to 19 MPa in the cross-machine direction. In some embodiments, the roofing material, when tested according to ASTM D638, exhibits a tensile modulus of 1 MPa to 18 MPa in the cross-machine direction. In some embodiments, the roofing material, when tested according to ASTM D638, exhibits a tensile modulus of 1 MPa to 17 MPa in the cross-machine direction. In some embodiments, the roofing material, when tested according to ASTM D638, exhibits a tensile modulus of 1 MPa to 16 MPa in the cross-machine direction. In some embodiments, the roofing material, when tested according to ASTM D638, exhibits a tensile modulus of 1 MPa to 15 MPa in the cross-machine direction. In some embodiments, the roofing material, when tested according to ASTM D638, exhibits a tensile modulus of 1 MPa to 14 MPa in the cross-machine direction. In some embodiments, the roofing material, when tested according to ASTM D638, exhibits a tensile modulus of 1 MPa to 13 MPa in the cross-machine direction. In some embodiments, the roofing material, when tested according to ASTM D638, exhibits a tensile modulus of 1 MPa to 12 MPa in the cross-machine direction. In some embodiments, the roofing material, when tested according to ASTM D638, exhibits a tensile modulus of 1 MPa to 11 MPa in the cross-machine direction. In some embodiments, the roofing material, when tested according to ASTM D638, exhibits a tensile modulus of 1 MPa to 10 MPa in the cross-machine direction. In some embodiments, the roofing material, when tested according to ASTM D638, exhibits a tensile modulus of 1 MPa to 9 MPa in the cross-machine direction. In some embodiments, the roofing material, when tested according to ASTM D638, exhibits a tensile modulus of 1 MPa to 8 MPa in the cross-machine direction. In some embodiments, the roofing material, when tested according to ASTM D638, exhibits a tensile modulus of 1 MPa to 7 MPa in the cross-machine direction. In some embodiments, the roofing material, when tested according to ASTM D638, exhibits a tensile modulus of 1 MPa to 6 MPa in the cross-machine direction. In some embodiments, the roofing material, when tested according to ASTM D638, exhibits a tensile modulus of 1 MPa to 5 MPa in the cross-machine direction. In some embodiments, the roofing material, when tested according to ASTM D638, exhibits a tensile modulus of 1 MPa to 4 MPa in the cross-machine direction. In some embodiments, the roofing material, when tested according to ASTM D638, exhibits a tensile modulus of 1 MPa to 3 MPa in the cross-machine direction. In some embodiments, the roofing material, when tested according to ASTM D638, exhibits a tensile modulus of 1 MPa to 2 MPa in the cross-machine direction.

In some embodiments, the roofing material, when tested according to ASTM D638, exhibits a tensile modulus of 2 MPa to 20 MPa in the cross-machine direction. In some embodiments, the roofing material, when tested according to ASTM D638, exhibits a tensile modulus of 3 MPa to 20 MPa in the cross-machine direction. In some embodiments, the roofing material, when tested according to ASTM D638, exhibits a tensile modulus of 4 MPa to 20 MPa in the cross-machine direction. In some embodiments, the roofing material, when tested according to ASTM D638, exhibits a tensile modulus of 5 MPa to 20 MPa in the cross-machine direction. In some embodiments, the roofing material, when tested according to ASTM D638, exhibits a tensile modulus of 6 MPa to 20 MPa in the cross-machine direction. In some embodiments, the roofing material, when tested according to ASTM D638, exhibits a tensile modulus of 7 MPa to 20 MPa in the cross-machine direction. In some embodiments, the roofing material, when tested according to ASTM D638, exhibits a tensile modulus of 8 MPa to 20 MPa in the cross-machine direction. In some embodiments, the roofing material, when tested according to ASTM D638, exhibits a tensile modulus of 9 MPa to 20 MPa in the cross-machine direction. In some embodiments, the roofing material, when tested according to ASTM D638, exhibits a tensile modulus of 10 MPa to 20 MPa in the cross-machine direction. In some embodiments, the roofing material, when tested according to ASTM D638, exhibits a tensile modulus of 11 MPa to 20 MPa in the cross-machine direction. In some embodiments, the roofing material, when tested according to ASTM D638, exhibits a tensile modulus of 12 MPa to 20 MPa in the cross-machine direction. In some embodiments, the roofing material, when tested according to ASTM D638, exhibits a tensile modulus of 13 MPa to 20 MPa in the cross-machine direction. In some embodiments, the roofing material, when tested according to ASTM D638, exhibits a tensile modulus of 14 MPa to 20 MPa in the cross-machine direction. In some embodiments, the roofing material, when tested according to ASTM D638, exhibits a tensile modulus of 15 MPa to 20 MPa in the cross-machine direction. In some embodiments, the roofing material, when tested according to ASTM D638, exhibits a tensile modulus of 16 MPa to 20 MPa in the cross-machine direction. In some embodiments, the roofing material, when tested according to ASTM D638, exhibits a tensile modulus of 17 MPa to 20 MPa in the cross-machine direction. In some embodiments, the roofing material, when tested according to ASTM D638, exhibits a tensile modulus of 18 MPa to 20 MPa in the cross-machine direction. In some embodiments, the roofing material, when tested according to ASTM D638, exhibits a tensile modulus of 19 MPa to 20 MPa in the cross-machine direction.

In some embodiments, the roofing material, after being flattened in an oven for 10 minutes at 158° F. and tested according to ASTM D638, exhibits a tensile modulus of 15 MPa or less in a machine direction. In some embodiments, the roofing material, after being flattened in an oven for 10 minutes at 158° F. and tested according to ASTM D638, exhibits a tensile modulus of 1 MPa to 15 MPa in the machine direction. In some embodiments, the roofing material, after being flattened in an oven for 10 minutes at 158° F. and tested according to ASTM D638, exhibits a tensile modulus of 2 MPa to 15 MPa in the machine direction. In some embodiments, the roofing material, after being flattened in an oven for 10 minutes at 158° F. and tested according to ASTM D638, exhibits a tensile modulus of 3 MPa to 15 MPa in the machine direction. In some embodiments, the roofing material, after being flattened in an oven for 10 minutes at 158° F. and tested according to ASTM D638, exhibits a tensile modulus of 4 MPa to 15 MPa in the machine direction. In some embodiments, the roofing material, after being flattened in an oven for 10 minutes at 158° F. and tested according to ASTM D638, exhibits a tensile modulus of 5 MPa to 15 MPa in the machine direction. In some embodiments, the roofing material, after being flattened in an oven for 10 minutes at 158° F. and tested according to ASTM D638, exhibits a tensile modulus of 6 MPa to 15 MPa in the machine direction. In some embodiments, the roofing material, after being flattened in an oven for 10 minutes at 158° F. and tested according to ASTM D638, exhibits a tensile modulus of 7 MPa to 15 MPa in the machine direction. In some embodiments, the roofing material after being flattened in an oven for 10 minutes at 158° F. and tested according to ASTM D638, exhibits a tensile modulus of 8 MPa to 15 MPa in the machine direction. In some embodiments, the roofing material, after being flattened in an oven for 10 minutes at 158° F. and tested according to ASTM D638, exhibits a tensile modulus of 9 MPa to 15 MPa in the machine direction. In some embodiments, the roofing material, after being flattened in an oven for 10 minutes at 158° F. and tested according to ASTM D638, exhibits a tensile modulus of 10 MPa to 15 MPa in the machine direction. In some embodiments, the roofing material, after being flattened in an oven for 10 minutes at 158° F. and tested according to ASTM D638, exhibits a tensile modulus of 11 MPa to 15 MPa in the machine direction. In some embodiments, the roofing material, after being flattened in an oven for 10 minutes at 158° F. and tested according to ASTM D638, exhibits a tensile modulus of 12 MPa to 15 MPa in the machine direction. In some embodiments, the roofing material, after being flattened in an oven for 10 minutes at 158° F. and tested according to ASTM D638, exhibits a tensile modulus of 13 MPa to 15 MPa in the machine direction. In some embodiments, the roofing material, after being flattened in an oven for 10 minutes at 158° F. and tested according to ASTM D638, exhibits a tensile modulus of 14 MPa to 15 MPa in the machine direction.

In some embodiments, the roofing material, after being flattened in an oven for 10 minutes at 158° F. and tested according to ASTM D638, exhibits a tensile modulus of 10 MPa or less in the cross-machine direction. In some embodiments, the roofing material, after being flattened in an oven for 10 minutes at 158° F. and tested according to ASTM D638, exhibits a tensile modulus of 1 MPa to 10 MPa in the cross-machine direction. In some embodiments, the roofing material, after being flattened in an oven for 10 minutes at 158° F. and tested according to ASTM D638, exhibits a tensile modulus of 1 MPa to 9 MPa in the cross-machine direction. In some embodiments, the roofing material, after being flattened in an oven for 10 minutes at 158° F. and tested according to ASTM D638, exhibits a tensile modulus of 1 MPa to 8 MPa in the cross-machine direction. In some embodiments, the roofing material, after being flattened in an oven for 10 minutes at 158° F. and tested according to ASTM D638, exhibits a tensile modulus of 1 MPa to 7 MPa in the cross-machine direction. In some embodiments, the roofing material, after being flattened in an oven for 10 minutes at 158° F. and tested according to ASTM D638, exhibits a tensile modulus of 1 MPa to 6 MPa in the cross-machine direction. In some embodiments, the roofing material, after being flattened in an oven for 10 minutes at 158° F. and tested according to ASTM D638, exhibits a tensile modulus of 1 MPa to 5 MPa in the cross-machine direction. In some embodiments, the roofing material, after being flattened in an oven for 10 minutes at 158° F. and tested according to ASTM D638, exhibits a tensile modulus of 1 MPa to 4 MPa in the cross-machine direction. In some embodiments, the roofing material, after being flattened in an oven for 10 minutes at 158° F. and tested according to ASTM D638, exhibits a tensile modulus of 1 MPa to 3 MPa in the cross-machine direction. In some embodiments, the roofing material, after being flattened in an oven for 10 minutes at 158° F. and tested according to ASTM D638, exhibits a tensile modulus of 1 MPa to 2 MPa in the cross-machine direction.

In some embodiments, the roofing material, after being flattened in an oven for 10 minutes at 158° F. and tested according to ASTM D638, exhibits a tensile modulus of 2 MPa to 10 MPa in the cross-machine direction. In some embodiments, the roofing material, after being flattened in an oven for 10 minutes at 158° F. and tested according to ASTM D638, exhibits a tensile modulus of 3 MPa to 10 MPa in the cross-machine direction. In some embodiments, the roofing material, after being flattened in an oven for 10 minutes at 158° F. and tested according to ASTM D638, exhibits a tensile modulus of 4 MPa to 10 MPa in the cross-machine direction. In some embodiments, the roofing material, after being flattened in an oven for 10 minutes at 158° F. and tested according to ASTM D638, exhibits a tensile modulus of 5 MPa to 10 MPa in the cross-machine direction. In some embodiments, the roofing material, after being flattened in an oven for 10 minutes at 158° F. and tested according to ASTM D638, exhibits a tensile modulus of 6 MPa to 10 MPa in the cross-machine direction. In some embodiments, the roofing material, after being flattened in an oven for 10 minutes at 158° F. and tested according to ASTM D638, exhibits a tensile modulus of 7 MPa to 10 MPa in the cross-machine direction. In some embodiments, the roofing material, after being flattened in an oven for 10 minutes at 158° F. and tested according to ASTM D638, exhibits a tensile modulus of 8 MPa to 10 MPa in the cross-machine direction. In some embodiments, the roofing material, after being flattened in an oven for 10 minutes at 158° F. and tested according to ASTM D638, exhibits a tensile modulus of 9 MPa to 10 MPa in the cross-machine direction.

In some embodiments, the roofing material is not flattened in an oven. In some embodiments, the roofing material is not flattened in an oven for 10 minutes at 158° F.

In some embodiments, the roofing material comprises a roofing membrane. In some embodiments, the roofing material comprises an unreinforced roofing membrane. In some embodiments, the roofing material comprises a reinforced roofing membrane. In some embodiments, the roofing material comprises a roofing accessory. In some embodiments, the roofing accessory is at least one of a T-joint patch, a vent boot, a penetration pocket, a universal corner, a cover tape, a pipe boot, a split pipe boot, a square tube wrap, a pourable sealer pocket, a corner reinforcement, a roof penetration, or any combination thereof. In some embodiments, the roofing material comprises a roofing substrate. In some embodiments, the roofing substrate comprises at least one of an asphaltic substrate, a plywood substrate, a glass substrate, a cellulosic substrate, an underlayment, a roofing membrane (reinforced or unreinforced), a roof deck, a photovoltaic (PV) panel, a modified bitumen (MODBIT) substrate, an oriented strand board (OSB), a roll good, a board (such as but not limited to at least one of a foam board (e.g., a polyisocyanurate (ISO) foam board), a cover board, or any combination thereof), a fire retardant board, a hail resistant board, a high density cover board, a cement board, concrete, a base sheet, a pipe, a chimney, a wax paper, a roof shingle, a mat, a fabric, a glass mat, a fiberglass mat, a woven mat, a nonwoven a fabric, a polyester mat, a scrim, a coated scrim, or any combination thereof. In some embodiments, the roofing material comprises a roofing shingle.

FIG. 1 is a schematic diagram of a cross-section of at least a portion of a roofing material 100, according to some embodiments. As shown in FIG. 1, in some embodiments, the roofing material 100 comprises at least one layer 110. In some embodiments, the roofing material 100 comprises a reinforcement layer 120. In some embodiments, the at least one layer 110 is located on the reinforcement layer 120. In some embodiments, the reinforcement layer 120 directly contacts the at least one layer 110. In some embodiments, the reinforcement layer 120 is located between at least two of the at least one layer 110. For example, in some embodiments, the reinforcement layer 120 is located between a first layer and a second layer. In some embodiments, for example, the reinforcement layer 120 directly contacts the first layer. In some embodiments, the reinforcement layer 120 directly contacts the second layer. In some embodiments, the reinforcement layer 120 is embedded in the at least one layer 110. In some embodiments, an intervening layer is located between the reinforcement layer 120 and the at least one layer 110.

In some embodiments, the roofing material 100 comprises an adhesive layer 130. In some embodiments, the roofing material 100 comprises a release liner 140. In some embodiments, the adhesive layer 130 covers the at least one layer 110. In some embodiments, the adhesive layer 130 covers the reinforcement layer 120. In some embodiments, the adhesive layer 130 is located between the at least one layer 110 and the release liner 140. In some embodiments, the adhesive layer 130 is located between the reinforcement layer 120 and the release liner 140. In some embodiments, the adhesive layer 130 directly contacts the at least one layer

110. In some embodiments, the adhesive layer 130 directly contacts the reinforcement layer 120. In some embodiments, the adhesive layer 130 directly contacts the release liner 140. In some embodiments, when the roofing material 100 is installed on a roofing substrate, the adhesive layer 130 directly contacts the roofing substrate. In some embodiments, an intervening layer is located between the adhesive layer 130 and the roofing substrate. In some embodiments, an intervening layer is located between the adhesive layer 130 and at least one of the at least one layer 110, the reinforcement layer 120, or any combination thereof.

In some embodiments, the roofing material 100 does not comprise the reinforcement layer 120. In some embodiments, the roofing material 100 does not comprise the adhesive layer 130. In some embodiments, the roofing material 100 does not comprise the release liner 140.

It will be appreciated that any one or more of the at least one layers, the adhesive layers, the reinforcement layers, the release liners, etc. disclosed herein may be used, without departing from the scope of this disclosure.

Figure 2:
FIG. 2 is a schematic diagram of a cross-section of at least a portion of a roofing system, according to some embodiments.
Figure 2:
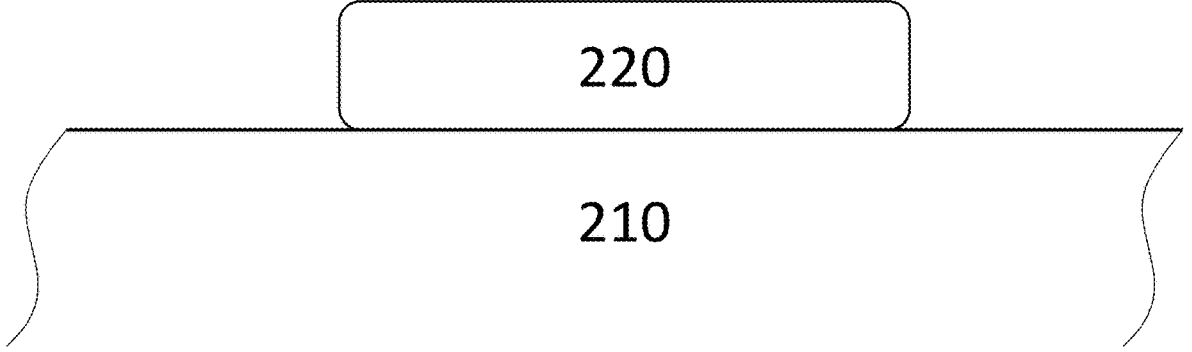

FIG. 2 is a schematic diagram of a cross-section of at least a portion of a roofing system 200, according to some embodiments. As shown in FIG. 2, the roofing system 200 comprises a roofing substrate 210. In some embodiments, the roofing system 200 comprises a roofing material 220. In some embodiments, the roofing material 220 is located on the roofing substrate 210. In some embodiments, the roofing material 220 covers the roofing substrate 210. In some embodiments, the roofing material 220 directly contacts the roofing substrate 210. In some embodiments, the roofing material 220 is bonded to the roofing substrate 210. In some embodiments, the roofing material 220 is heat welded to the roofing substrate 210. In some embodiments, the roofing material 220 is adhered to the roofing substrate 210. In some embodiments, an intervening layer is located between the roofing material 220 and the roofing substrate 210. In some embodiments, the roofing material is different from the roofing substrate. It will be appreciated that any one or more of the roofing substrates and/or roofing materials disclosed herein may be used, without departing from the scope of this disclosure.

Figure 3:
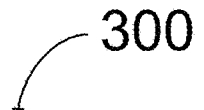
FIG. 3 is a schematic diagram of a cross-section of at least a portion of a roofing system, according to some embodiments.
Figure 3:
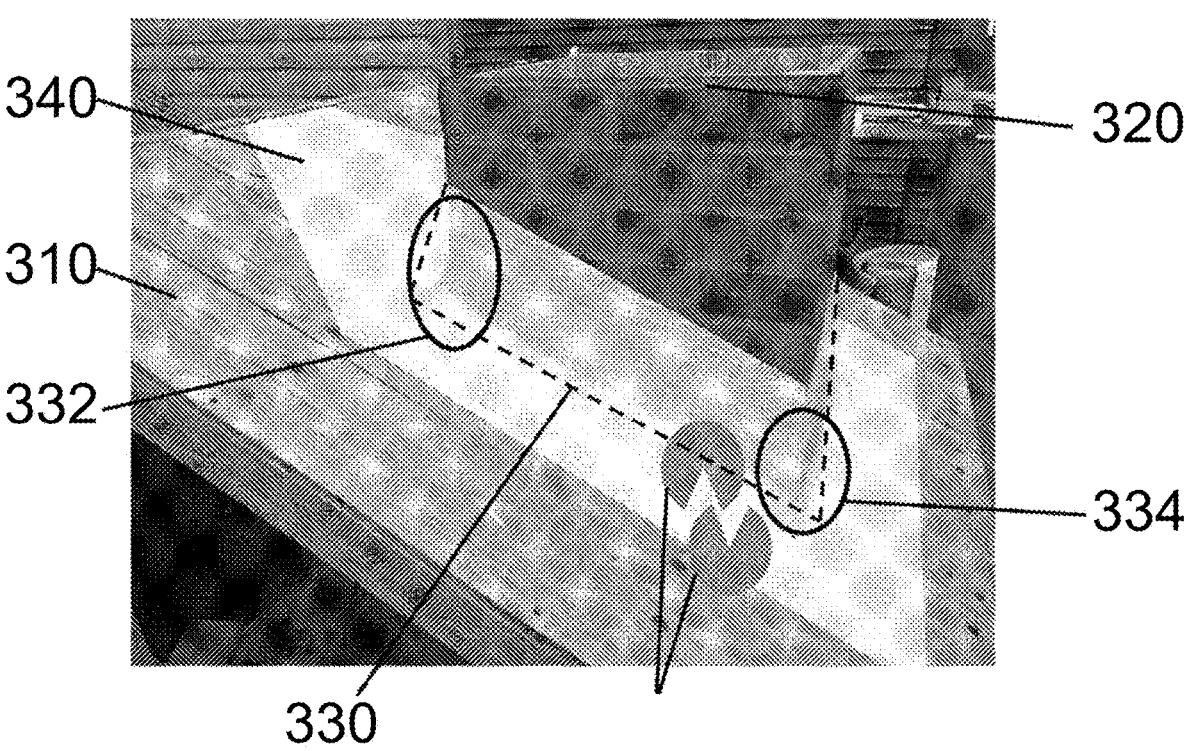

FIG. 3 is a schematic diagram of a cross-section of at least a portion of a roofing system 300, according to some embodiments. In some embodiments, the roofing system comprises a roofing substrate 310. In some embodiments, the roofing system comprises a protruding member 320. In some embodiments, the roofing system comprises a flashing area 330. In some embodiments, the roofing system comprises a roofing membrane 340. In some embodiments, the protruding member 320 protrudes from the roofing substrate 310. In some embodiments, the flashing area 330, which may comprise end 332 and end 334, is located at an interface between the roofing substrate 310 and the protruding member 320. In some embodiments, the roofing membrane 340 covers at least a portion of the flashing area 330, at least a portion of the protruding member 320, at least a portion of the roofing substrate 310, or any combination thereof. In some embodiments, the roofing membrane 340 comprises a first end and a second end opposite the first end. In some embodiments, the roofing membrane 340 covers at least the protruding member 320, such that the first end overlaps at least a portion of the second end to obtain an overlapping portion. In some embodiments, the first end and the send end are heat welded together in the overlapping portion. In some embodiments, the roofing membrane 340 is wrapped around and/or directly contacts at least the protruding member 320.

In some embodiments, when tested according to ASTM D413, a 180° peel strength between the first end and the second end in the overlapping portion is at least 2 pounds per linear inch (PLI). In some embodiments, when tested according to ASTM D413, a 180° peel strength between the first end and the second end in the overlapping portion is at least 5 PLI. In some embodiments, when tested according to ASTM D413, a 180° peel strength between the first end and the second end in the overlapping portion is at least 10 PLI. In some embodiments, when tested according to ASTM D413, a 180° peel strength between the first end and the second end in the overlapping portion is at least 15 PLI. In some embodiments, when tested according to ASTM D413, a 180° peel strength between the first end and the second end in the overlapping portion is at least 20 PLI. In some embodiments, when tested according to ASTM D413, a 180° peel strength between the first end and the second end in the overlapping portion is at least 25 PLI.

In some embodiments, when tested according to ASTM D413, a 180° peel strength between the first end and the second end in the overlapping portion is 2 PLI to 30 PLI. In some embodiments, when tested according to ASTM D413, a 180° peel strength between the first end and the second end in the overlapping portion is 2 PLI to 25 PLI. In some embodiments, when tested according to ASTM D413, a 180° peel strength between the first end and the second end in the overlapping portion is 2 PLI to 20 PLI. In some embodiments, when tested according to ASTM D413, a 180° peel strength between the first end and the second end in the overlapping portion is 2 PLI to 15 PLI. In some embodiments, when tested according to ASTM D413, a 180° peel strength between the first end and the second end in the overlapping portion is 2 PLI to 10 PLI. In some embodiments, when tested according to ASTM D413, a 180° peel strength between the first end and the second end in the overlapping portion is 2 PLI to 5 PLI.

In some embodiments, when tested according to ASTM D413, a 180° peel strength between the first end and the second end in the overlapping portion is 5 PLI to 30 PLI. In some embodiments, when tested according to ASTM D413, a 180° peel strength between the first end and the second end in the overlapping portion is 10 PLI to 30 PLI. In some embodiments, when tested according to ASTM D413, a 180° peel strength between the first end and the second end in the overlapping portion is 15 PLI to 30 PLI. In some embodiments, when tested according to ASTM D413, a 180° peel strength between the first end and the second end in the overlapping portion is 20 PLI to 30 PLI. In some embodiments, when tested according to ASTM D413, a 180° peel strength between the first end and the second end in the overlapping portion is 25 PLI to 30 PLI.

It will be appreciated that any of the roofing substrates and/or roofing membranes disclosed herein may be used, without departing from the scope of this disclosure.

Example 1

A sample membrane was prepared. The sample membrane was prepared, as an unreinforced membrane, from a formulation comprising two different random propylene copolymers comprising ethylene, and 1% to 10% by weight of a colorant, an antioxidant, an ultraviolet stabilizer, and a processing aid. The formulation did not comprise a limestone, nor a fire retardant. The tensile modulus of the sample membrane was compared to a comparative membrane 1 and a comparative membrane 2 to evaluate the comparative strength of the membranes. The tensile modulus of all the membranes was measured according to ASTM D638 as a Type IV specimen. The comparative membrane 1 and the comparative membrane 2 both were single layer, unreinforced membranes. The tensile modulus in the machine direction and the cross-machine direction are summarized in Table 1 below.

TABLE 1

| Tensile Modulus Measured According to ASTM D638 | | |
|---|---|---|
| | Machine Direction (MD) (MPa) | Cross-Machine Direction (CD) (MPa) |
| Sample Membrane | 19 | 12 |
| Comparative Membrane 1 | 22 | 16 |
| Comparative Membrane 2 | 48 | 38 |

As shown in Table 1 above, the sample membrane exhibited a tensile modulus of 20 MPa or less in the machine direction and a tensile modulus of 15 MPa or less in the cross-machine direction, when tested according to ASTM D638.

Example 2

The sample membrane, comparative membrane 1, and comparative membrane 2 were flattened in an oven for 10 minutes at 158° F. The membranes were removed from the oven and the tensile modulus of all membranes was measured according to ASTM D638 as a Type IV specimen. The tensile modulus of the sample membrane was compared to the comparative membrane 1 and the comparative membrane 2 to evaluate the comparative flexibility of the membranes. The tensile modulus in the machine direction and the cross-machine direction are summarized in Table 2 below.

TABLE 2

| Tensile Modulus Measured According to ASTM D638 | | |
|---|---|---|
| | Machine Direction (MD) (MPa) | Cross-Machine Direction (CD) (MPa) |
| Sample Membrane | 15 | 9 |
| Comparative Membrane 1 | 16 | 12 |
| Comparative Membrane 2 | 34 | 31 |

As shown in Table 2 above, the sample membrane exhibited a tensile modulus of 15 MPa or less in the machine direction and a tensile modulus of 10 MPa or less in the cross-machine direction, after being flattened in an oven for 10 minutes at 158° F. and tested according to ASTM D638.

Example 3

A second sample membrane was prepared (sample membrane 2). Sample membrane 2 was prepared, as an unreinforced membrane, from a formulation comprising two different random propylene copolymers comprising ethylene, and 1% to 25% by weight of a colorant, an antioxidant, an ultraviolet stabilizer, a processing aid, and a fire retardant. The formulation did not comprise a limestone. The tensile modulus of the sample membrane 2 was compared to a comparative membrane 2 to evaluate the comparative strength of the membranes. The tensile modulus of all the membranes was measured according to ASTM D638 as a Type IV specimen. The comparative membrane 2 was a single layer, unreinforced membrane. The tensile modulus in the machine direction and the cross-machine direction are summarized in Table 3 below.

TABLE 3

| Tensile Modulus Measured According to ASTM D638 | | |
|---|---|---|
| | Machine Direction (MD) (MPa) | Cross-Machine Direction (CD) (MPa) |
| Sample Membrane 2 | 34 | 16 |
| Comparative Membrane 2 | 48 | 38 |

What is claimed is:

1. A roofing membrane comprising:
a first layer,
  wherein the first layer comprises:
    1% to 65% by weight of a first non-styrenic propylene copolymer based on a total weight of the first layer; and
    1% to 65% by weight of a second non-styrenic propylene copolymer based on the total weight of the first layer,
      wherein the first non-styrenic propylene copolymer is different from the second non-styrenic propylene copolymer;
  wherein the roofing membrane does not comprise;
  A) a reinforcement layer, nor
  B) an olefin block copolymer.

2. The roofing membrane of claim 1, wherein the first non-styrenic propylene copolymer comprises ethylene.

3. The roofing membrane of claim 2, wherein the second non-styrenic propylene copolymer comprises ethylene.

4. The roofing membrane of claim 1, wherein the second non-styrenic propylene copolymer comprises an isotactic propylene.

5. The roofing membrane of claim 1, further comprising:
0.1% to 25% by weight of at least one additive based on the total weight of the first layer,
  wherein the at least one additive comprises at least one of a colorant, an antioxidant, an ultraviolet stabilizer, a processing aid, a fire retardant, or any combination thereof.

6. The roofing membrane of claim 1, further comprising:
an adhesive layer; and
a release liner;
  wherein the adhesive layer is located between the first layer and the release liner;
  wherein the release liner covers the adhesive layer.

7. The roofing membrane of claim 1, wherein the first layer comprises:
30% to 50% by weight of the first non-styrenic propylene copolymer based on a total weight of the first layer; and
30% to 50% by weight of the second non-styrenic propylene copolymer based on the total weight of the first layer.

8. The roofing membrane of claim 1, wherein the first layer comprises:
40% to 65% by weight of the first non-styrenic propylene copolymer based on a total weight of the first layer; and
10% to 30% by weight of the second non-styrenic propylene copolymer based on the total weight of the first layer.

9. A roofing system comprising:
a roofing substrate; and
a roofing membrane,
  wherein the roofing membrane is located on the roofing substrate;

wherein the roofing membrane comprises:
  a first layer,
    wherein the first layer comprises:
    1% to 65% by weight of a first non-styrenic propylene copolymer based on a total weight of the first layer; and
    1% to 65% by weight of a second non-styrenic propylene copolymer based on the total weight of the first layer;
      wherein the first non-styrenic propylene copolymer is different from the second non-styrenic propylene copolymer;
  wherein the roofing membrane does not comprise;
    A) a reinforcement layer, nor
    B) an olefin block copolymer.

10. The roofing system of claim 9, wherein the roofing membrane further comprises:
an adhesive layer,
  wherein the adhesive layer is located between the first layer and the roofing substrate;
  wherein the adhesive layer adheres the roofing membrane to the roofing substrate.

11. The roofing system of claim 9, wherein the first layer comprises:
30% to 50% by weight of the first non-styrenic propylene copolymer based on a total weight of the first layer; and
30% to 50% by weight of the second non-styrenic propylene copolymer based on the total weight of the first layer.

12. The roofing system of claim 9, wherein the first layer comprises:
40% to 65% by weight of the first non-styrenic propylene copolymer based on a total weight of the first layer; and
10% to 30% by weight of the second non-styrenic propylene copolymer based on the total weight of the first layer.

13. A roofing membrane comprising:
a first layer,
  wherein the first layer consists essentially of:
    1% to 65% by weight of a first non-styrenic propylene copolymer based on a total weight of the first layer; and
    1% to 65% by weight of a second non-styrenic propylene copolymer based on the total weight of the first layer,
      wherein the first non-styrenic propylene copolymer is different from the second non-styrenic propylene copolymer; and
    no greater than 25% by weight of at least one additive based on the total weight of the first layer,
      wherein the at least one additive comprises at least one of a colorant, an antioxidant, an ultraviolet stabilizer, a processing aid, a fire retardant, or any combination thereof;
  wherein the roofing membrane does not comprise;
  A) a reinforcement layer, nor
  B) an olefin block copolymer.

14. The roofing membrane of claim 13, further comprising:
an adhesive layer; and
a release liner;
  wherein the adhesive layer is located between the first layer and the release liner;
  wherein the release liner covers the adhesive layer.

15. The roofing membrane of claim 13, wherein the first layer comprises:

30% to 50% by weight of the first non-styrenic propylene copolymer based on a total weight of the first layer; and 30% to 50% by weight of the second non-styrenic propylene copolymer based on the total weight of the first layer.

16. The roofing membrane of claim 13, wherein the first layer comprises:

40% to 65% by weight of the first non-styrenic propylene copolymer based on a total weight of the first layer; and 10% to 30% by weight of the second non-styrenic propylene copolymer based on the total weight of the first layer.

17. A roofing system comprising:

a roofing substrate;

a protruding member;

a flashing area; and a roofing membrane;

wherein the protruding member protrudes from the roofing substrate;

wherein the flashing area is located at an interface between the roofing substrate and the protruding member;

wherein the roofing membrane covers the flashing area, at least a portion of the protruding member, and at least a portion of the roofing substrate;

wherein the roofing membrane comprises:

1% to 65% by weight of a first non-styrenic propylene copolymer based on a total weight of the roofing membrane; and 1% to 65% by weight of a second non-styrenic propylene copolymer based on the total weight of the roofing membrane, wherein the first non-styrenic propylene copolymer is different from the second non-styrenic propylene copolymer;

wherein the roofing membrane does not comprise:

A) a reinforcement layer, nor

B) an olefin block copolymer.

18. The roofing system of claim 17, wherein the roofing membrane comprises:

a first end, and a second end opposite the first end, wherein the roofing membrane covers the protruding member, such that the first end overlaps at least a portion of the second end to obtain an overlapping portion, wherein the first end and the second end are heat welded together in the overlapping portion.

19. The roofing system of claim 17, wherein the first layer comprises:

30% to 50% by weight of the first non-styrenic propylene copolymer based on a total weight of the first layer; and 30% to 50% by weight of the second non-styrenic propylene copolymer based on the total weight of the first layer.

20. The roofing system of claim 17, wherein the first layer comprises:

40% to 65% by weight of the first non-styrenic propylene copolymer based on a total weight of the first layer; and 10% to 30% by weight of the second non-styrenic propylene copolymer based on the total weight of the first layer.

* * * * *